United States Patent
Chowdhury et al.

(10) Patent No.: US 9,414,200 B2
(45) Date of Patent: Aug. 9, 2016

(54) OPTIMIZATION OF A BACKHAUL CONNECTION IN A MOBILE COMMUNICATIONS NETWORK

(71) Applicant: Altiostar Networks, Inc., Tewksbury, MA (US)

(72) Inventors: Kuntal Chowdhury, Andover, MA (US); Ashraf M. Dahod, Andover, MA (US)

(73) Assignee: AltioStar Networks, Inc., Tewksbury, MA (US)

( * ) Notice: Subject to any disclaimer, the term of this patent is extended or adjusted under 35 U.S.C. 154(b) by 63 days.

(21) Appl. No.: 14/225,001

(22) Filed: Mar. 25, 2014

(65) Prior Publication Data

US 2014/0286165 A1    Sep. 25, 2014

Related U.S. Application Data

(60) Provisional application No. 61/804,889, filed on Mar. 25, 2013, provisional application No. 61/804,965, filed on Mar. 25, 2013, provisional application No. 61/804,978, filed on Mar. 25, 2013.

(51) Int. Cl.
*H04W 28/08* (2009.01)
*H04W 4/02* (2009.01)

(52) U.S. Cl.
CPC ................................ *H04W 4/028* (2013.01)

(58) Field of Classification Search
CPC ... H04L 67/2842; H04L 67/325; H04W 4/00; H04W 88/08
USPC .................................................. 370/235, 229
See application file for complete search history.

(56) References Cited

U.S. PATENT DOCUMENTS

| 8,531,947 | B2 | 9/2013 | Zhao et al. |
| 8,732,403 | B1 * | 5/2014 | Nayak ................... G06F 3/0641 711/135 |
| 9,107,230 | B2 * | 8/2015 | Jin ..................... H04W 72/1242 |
| 9,118,730 | B2 * | 8/2015 | Fernandez Alonso ............... H04L 67/2842 |
| 2002/0172178 | A1 | 11/2002 | Suzuki et al. |

(Continued)

FOREIGN PATENT DOCUMENTS

| EP | 2 200 390 A2 | 6/2010 |
| EP | 2 501 141 A2 | 9/2012 |

(Continued)

OTHER PUBLICATIONS

Balakrishnan, et al., (1995); "Improving Reliable Transport and Handoff Performance in Cellular Wireless Networks", Wireless Networks, ACM, 1:469-481.

(Continued)

*Primary Examiner* — Chi H Pham
*Assistant Examiner* — Robert Lopata
(74) *Attorney, Agent, or Firm* — Mintz Levin Cohn Ferris Glovsky and Popeo, P.C.

(57) ABSTRACT

A system, a method, a device, and a computer program product for transmission of data between a user device and a server. A first data received from the user device and a second data received from the server are processed. A determination is made whether to store at least a portion of the second data in at least one memory. The stored portion of the second data is provided to the user device in response to receiving the first data.

39 Claims, 15 Drawing Sheets

(56) References Cited

U.S. PATENT DOCUMENTS

| | | | |
|---|---|---|---|
| 2003/0043844 A1* | 3/2003 | Heller | H04L 29/06 370/466 |
| 2003/0235171 A1 | 12/2003 | Lundstrom et al. | |
| 2006/0206524 A1* | 9/2006 | MacLaurin | G06F 17/30569 |
| 2008/0153496 A1* | 6/2008 | Fukuzawa | H04W 88/181 455/436 |
| 2008/0273498 A1* | 11/2008 | Jalil | H04W 36/02 370/331 |
| 2009/0201813 A1 | 8/2009 | Speight | |
| 2009/0252148 A1 | 10/2009 | Dolganow et al. | |
| 2010/0054231 A1 | 3/2010 | Dolganow et al. | |
| 2010/0062781 A1 | 3/2010 | Dolganow et al. | |
| 2010/0067489 A1 | 3/2010 | Pelletier et al. | |
| 2010/0290468 A1* | 11/2010 | Lynam | H04L 45/742 370/392 |
| 2011/0141887 A1* | 6/2011 | Klein | H04W 4/00 370/230 |
| 2011/0242975 A1 | 10/2011 | Zhao et al. | |
| 2011/0267951 A1 | 11/2011 | Stanwood et al. | |
| 2012/0082131 A1* | 4/2012 | Agrawal | H04W 36/08 370/331 |
| 2012/0163298 A1 | 6/2012 | Zhou et al. | |
| 2012/0166448 A1* | 6/2012 | Li | G06F 17/30097 707/747 |
| 2012/0250570 A1* | 10/2012 | Parker | H04L 43/0882 370/253 |
| 2012/0257581 A1 | 10/2012 | De | |
| 2012/0287858 A1* | 11/2012 | Klein | H04W 4/00 370/328 |
| 2012/0300710 A1 | 11/2012 | Li et al. | |
| 2012/0300747 A1 | 11/2012 | Westberg et al. | |
| 2012/0320824 A1* | 12/2012 | Bari | H04W 12/06 370/328 |
| 2013/0046949 A1* | 2/2013 | Colgrove | G06F 3/0608 711/170 |
| 2013/0051329 A1 | 2/2013 | Take | |
| 2013/0272181 A1 | 10/2013 | Fong et al. | |
| 2013/0343296 A1* | 12/2013 | Dinan | H04W 76/02 370/329 |
| 2014/0025781 A1* | 1/2014 | Ye | H04L 67/2814 709/219 |
| 2014/0105174 A1* | 4/2014 | Agrawal | H04W 4/00 370/331 |
| 2014/0226481 A1 | 8/2014 | Dahod et al. | |
| 2014/0233384 A1* | 8/2014 | Howard | H04W 28/0289 370/235 |
| 2014/0233413 A1 | 8/2014 | Dahod et al. | |
| 2014/0233459 A1 | 8/2014 | Dahod et al. | |
| 2014/0233479 A1 | 8/2014 | Dahod et al. | |
| 2014/0241153 A1* | 8/2014 | Chowdhury | H04W 36/22 370/230 |
| 2014/0376412 A1* | 12/2014 | Li | H04L 43/028 370/259 |
| 2015/0117185 A1* | 4/2015 | Kim | H04W 28/0247 370/230 |

FOREIGN PATENT DOCUMENTS

| | | |
|---|---|---|
| EP | 2 530 988 A1 | 12/2012 |
| WO | WO-2011/080714 A2 | 7/2011 |
| WO | WO-2012/084636 A1 | 6/2012 |
| WO | WO-2012/139016 A2 | 10/2012 |
| WO | WO-2012/139664 A1 | 10/2012 |
| WO | WO-2012/177763 A2 | 12/2012 |
| WO | WO-2013/038167 A2 | 3/2013 |
| WO | WO-2014/127054 A1 | 8/2014 |
| WO | WO-2014/130708 A1 | 8/2014 |
| WO | WO-2014/130709 A1 | 8/2014 |
| WO | WO-2014/130713 A1 | 8/2014 |
| WO | WO-2014/160709 A2 | 10/2014 |
| WO | WO-2014/160718 A1 | 10/2014 |
| WO | WO-2014/160722 A1 | 10/2014 |

OTHER PUBLICATIONS

Border et al., (2001); "Performance Enhancing Proxies Intended to Mitigate Link-Related Degradations", Network Working Group Request for Comments: 3135; pp. 1-45.

Du, et al., (2009); "Downlink Scheduling for Multimedia Multicast/Broadcast over Mobile WiMAX: Connection-Oriented Multistate Adaptation", IEEE Wireless Communications, pp. 72-79.

Yoon, et al., (2012); "MuVi", Mobile Computing and Networking, ACM, pp. 209-220.

International Search Report for PCT/US2014/016123, mailed Jul. 22, 2014.

International Search Report for PCT/US2014/017456, mailed Jul. 3, 2014.

International Search Report for PCT/US2014/017459, mailed Jul. 3, 2014.

International Search Report for PCT/US2014/017464, mailed Jun. 16, 2014.

International Search Report for PCT/US2014/031749, mailed Aug. 5, 2014.

International Search Report for PCT/US2014/031725, mailed Oct. 7, 2014.

International Search Report for PCT/US2014/031744, mailed Sep. 4, 2014.

International Search Report for PCT/US2014/031753, mailed Aug. 14, 2014.

* cited by examiner

OPTIMIZATION OF A BACKHAUL CONNECTION IN A MOBILE COMMUNICATIONS NETWORK

CROSS-REFERENCE TO RELATED APPLICATIONS

The present application claims priority to U.S. Provisional Patent Application No. 61/804,889, filed Mar. 25, 2013, and entitled "Smart Evolved Node B For Backhaul Cost Reduction", U.S. Provisional Patent Application No. 61/804,965, filed Mar. 25, 2013, and entitled "Local Analytics-Based Content Fetching At An Evolved Node B", and U.S. Provisional Patent Application No. 61/804,978, filed Mar. 25, 2013, and entitled "Profile Based Content Positioning In A Mobile Communications Network", and incorporates their disclosures herein by reference in their entireties.

TECHNICAL FIELD

The subject matter described herein generally relates to data processing and in particular, to optimizing backhaul links in a long term evolution radio access network as well as reducing costs associated with operation of the backhaul links.

BACKGROUND

In today's world, cellular networks provide on-demand communications capabilities to individuals and business entities. Typically, a cellular network is wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide guaranteed bandwidth within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if when mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. LTE is based on the GSM/EDGE and UMTS/HSPA digital cellular technologies and allows for increasing capacity and speed by using a different radio interface together with core network improvements.

Cell site are typically connected to core networks, which provide connections to the Internet, for example, via backhaul connections. Backhaul connections handle a significant amount of data traffic that flows to and from the cell site to the core network. This can slow down data transfer rate over the backhaul connections and thus, cause slow down and/or interruption of data delivery to user equipment (e.g., mobile telephones, data terminals, etc.). To improve speed and/or quality of as well as reduce operational and/or capital costs associated with backhaul connections, such connections are typically optimized. Various conventional solutions exist for such optimizations. These include a radio access network ("RAN") offload solution and a content redundancy elimination solution.

The RAN offload solution is offered by many network providers. This solution allows for reduction of backhaul cost by branching out streams of data to-and-from the cell site, and transporting the offloaded traffic via lower cost links, e.g. DSL. However, this solution is deficient as it requires offloading traffic to an uncontrolled link e.g., DSL, without any quality of service ("QoS") guarantee. Other existing backhaul optimization solutions in the market employ simple bit-level redundancy elimination techniques. These solutions lack the application-based intelligent operation capabilities in terms of data traffic analysis and typically introduce another node (i.e., point of failure) in the backhaul connection. Additionally, these solutions cannot perform header compression, content pre-positioning, and analytics based content pre-fetching. Thus, there is a need to provide a wireless communication system that is capable of providing an efficient, cost-effective and reliable transmission of data on the backhaul connection.

SUMMARY

In some implementations, the current subject matter relates to a computer-implemented method for transmission of data between a user device and a server. The method can include processing a first data received from the user device and a second data received from the server. This operation can be performed by a base station (e.g., an eNodeB). The method can also include determining whether to store at least a portion of the second data in at least one memory, based on the determining, the portion of the second data can be stored in the at least one memory, and providing the stored portion of the second data (e.g., by the eNodeB) to the user device in response to receiving the first data. In some implementations, the second data can include data content that can be requested by the user device and/or forwarded by a content source (e.g., a server, a memory location, etc.), where the data content is located, in response to a request from the user device. In some implementations, such data content can be stored in a memory location, a database, etc. located at the base station and/or communicatively coupled to the base station.

In some implementations, the current subject matter can include one or more of the following optional features. The method can further include analyzing content of the second data to determine whether the second data includes at least one redundant data content, and deleting at least one redundant data content from the at least one memory. In some implementations, the redundant data content can include data that can be characterized by having a predetermined size (which can be configured and/or determined) and/or can have repeated bit patterns. Further, the redundant data content can be previously received and/or stored by the base station. In some implementations, the analysis of the content of the second data can include performing at least one of the following: a shallow packet inspection of at least one data packet in the second data, and a deep packet inspection of at least one data packet in the second data. In some implementations, a shallow packet inspection can be performed by inspecting one or more headers of the data packet to determine information associated with the data packet. For example, the shallow packet inspection can inspect an IP header of the data packet in order to determine the source IP address of the data packet. A deep packet inspection can be performed by examining other layers of the data packet. For example, the deep packet inspection can include an inspection of one or more of layers 1-7 of open systems interconnect ("OSI") model data packet. In some implementations, the payload of a data packet can be inspected to determine what resource blocks should be assigned to the data packet. In some implementations, the analysis of the content of the second data can include performing analysis based on at least one of the following factors: usage statistics of the second data, at least one trend associated with the second data, a popularity of the second data, application requesting the second data, content of the second data, time when the second data is requested by the user device and/or delivered to the user device, location of the user device, user device information, and a predictability of a usage of the second data by the user device.

In some implementations, the stored portion of the second data can be provided based on the age of the stored portion of the second data. In some implementations, the age of the content can be determined based on the date and/or time that the content is supplied to the user device and/or stored in a database of the base station. In some implementations, the content, whose age exceeded a certain time threshold (e.g., a day old content; an hour-old content, and/or any other time period etc.), can be purged from the database.

In some implementations, the method can include obtaining at least a portion of the second data for storage in the eNodeB base station. In some implementations, the method can include obtaining at least a portion of the second data without receiving a request to obtain the at least a portion of the second data from the user device. In some implementations, the method can include obtaining the at least a portion of the second data based on at least one communication with at least one of the following: the user device and a plurality of user devices.

In some implementations, a decoder module can perform analysis of the second data based on a payload signature associated with the second data, the payload signature including at least one pointer to a storage location of the stored portion of the second data. The payload signature can be received from an encoder module. The decoder module is configured to communicate with the encoder module. The payload signature can be determined based on a chunk boundary of the second data. In some implementations, the chunk boundary can be a fixed number of bytes (e.g., typically 512 bytes) associated with the data content, and/or it can be set using a low-bandwidth network file system ("LBFS") based on Rabin-Karp fingerprinting algorithm.

In some implementations, the stored portion of the second data can be stored in the at least one memory for a predetermined period of time. Upon expiration of the predetermined period of time, the stored portion of the second data can be purged from the at least one memory.

In some implementations, the method can include performing analysis of a content the second data based on at least one of the following: an application usage parameter associated with an application generating and/or using the content, a cost-per-click parameter associated with the content, a cost-per-thousand-impressions parameter associated with the content, a key performance indicator associated with the content, and a customer relationship management parameter associated with the content.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein. Additionally, computer systems may include additional specialized processing units that are able to apply a single instruction to multiple data points in parallel.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

DETAILED DESCRIPTION

To address the deficiencies of currently available solutions, one or more implementations of the current subject matter provide a long term evolution radio access network having intelligent capabilities, including cost reduction techniques in a base station of a mobile communications network.

I. Long Term Evolution Communications System

FIGS. 1a-c and 2 illustrate an exemplary conventional long term evolution ("LTE") communication system 100 along with its various components. An LTE system or a 4G LTE, as it commercially known, is governed by a standard for wireless communication of high-speed data for mobile telephones and data terminals. The standard is based on the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard is developed by the 3GPP ("3rd Generation Partnership Project").

Figure 1A:
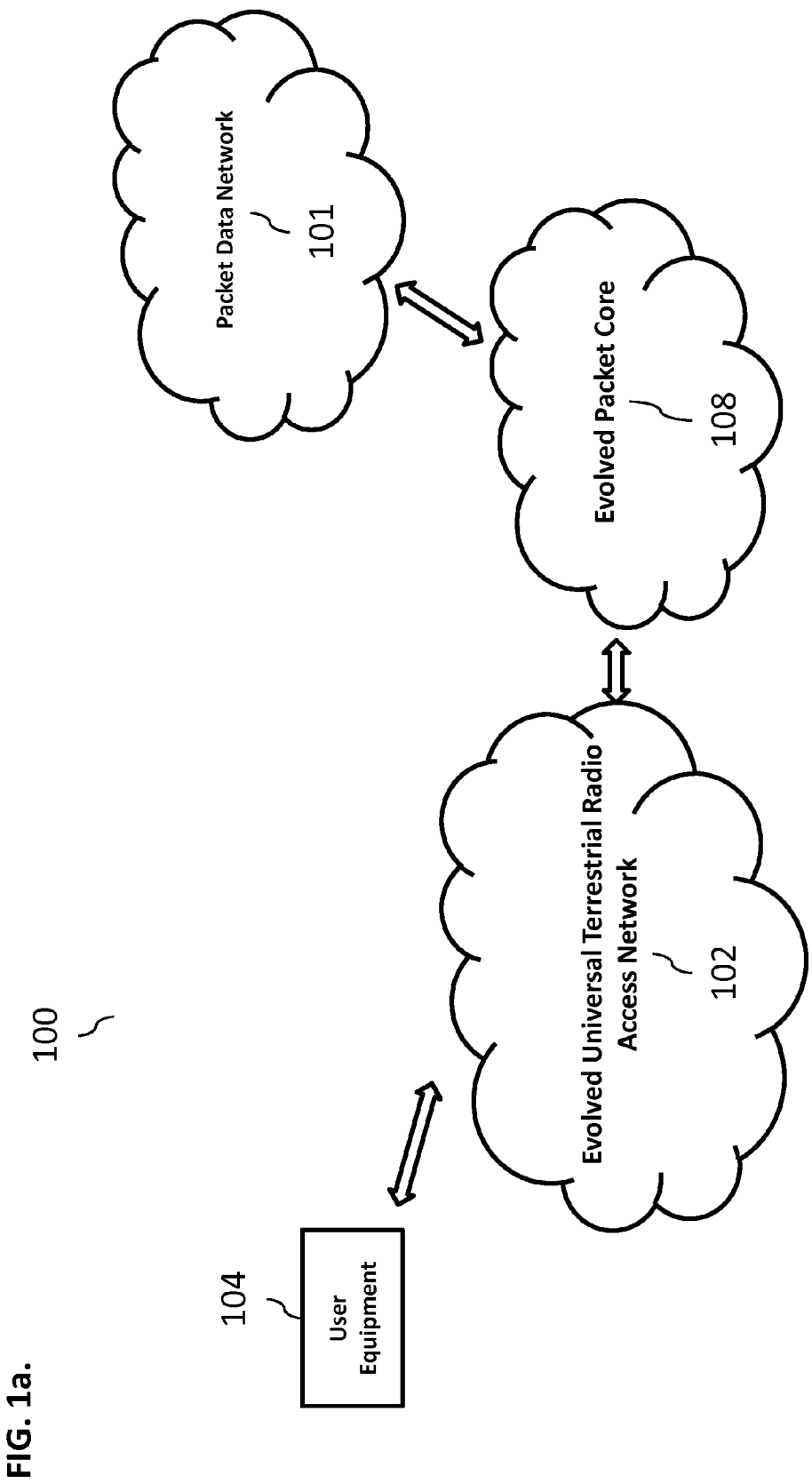
FIG. 1a illustrates an exemplary conventional long term evolution ("LTE") communications system.
Figure 1B:
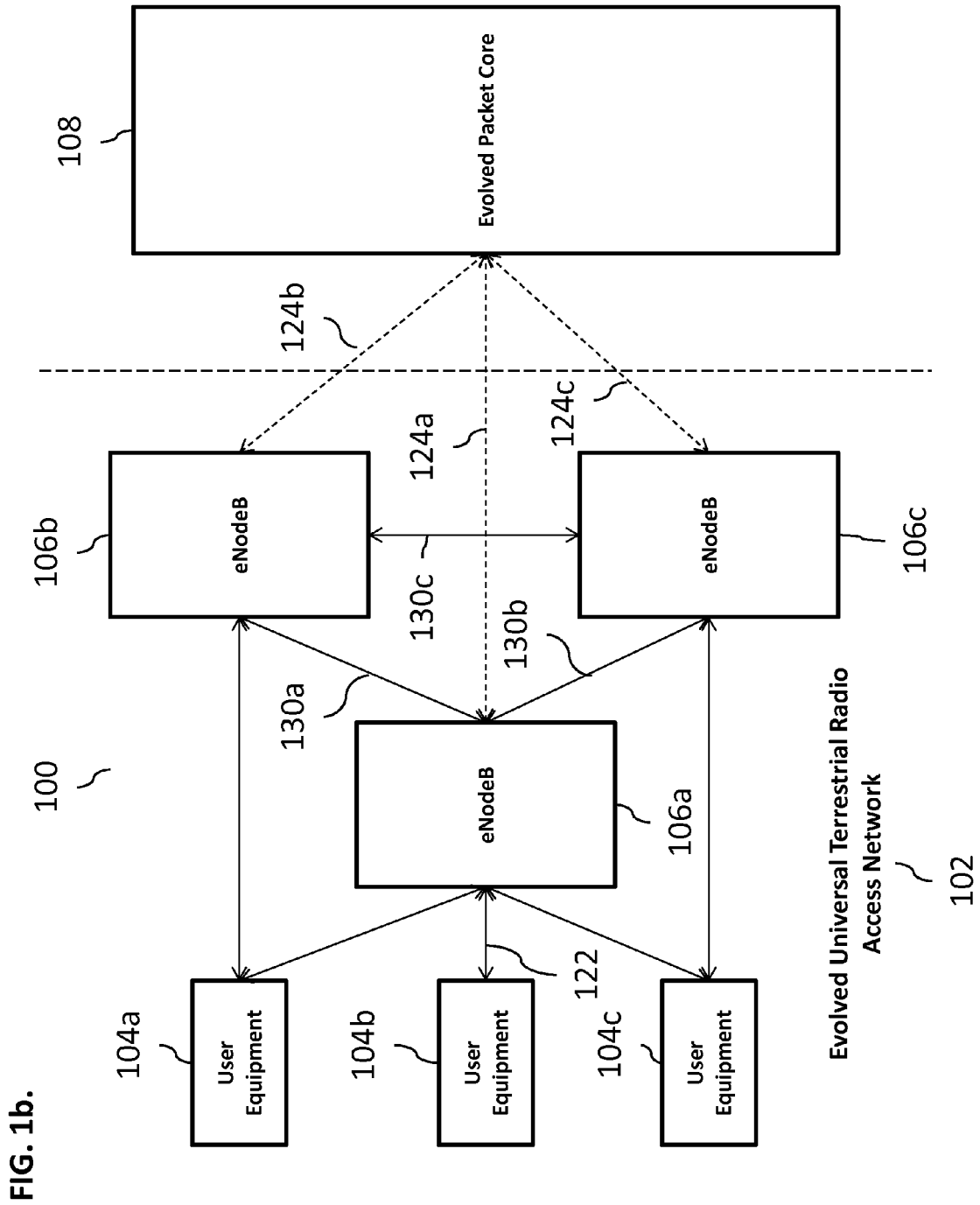

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 1b) that provide communication capabilities to a plurality of user equipment 104(a, b, c). The user equipment 104 can be a mobile telephone, a smartphone, a table, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
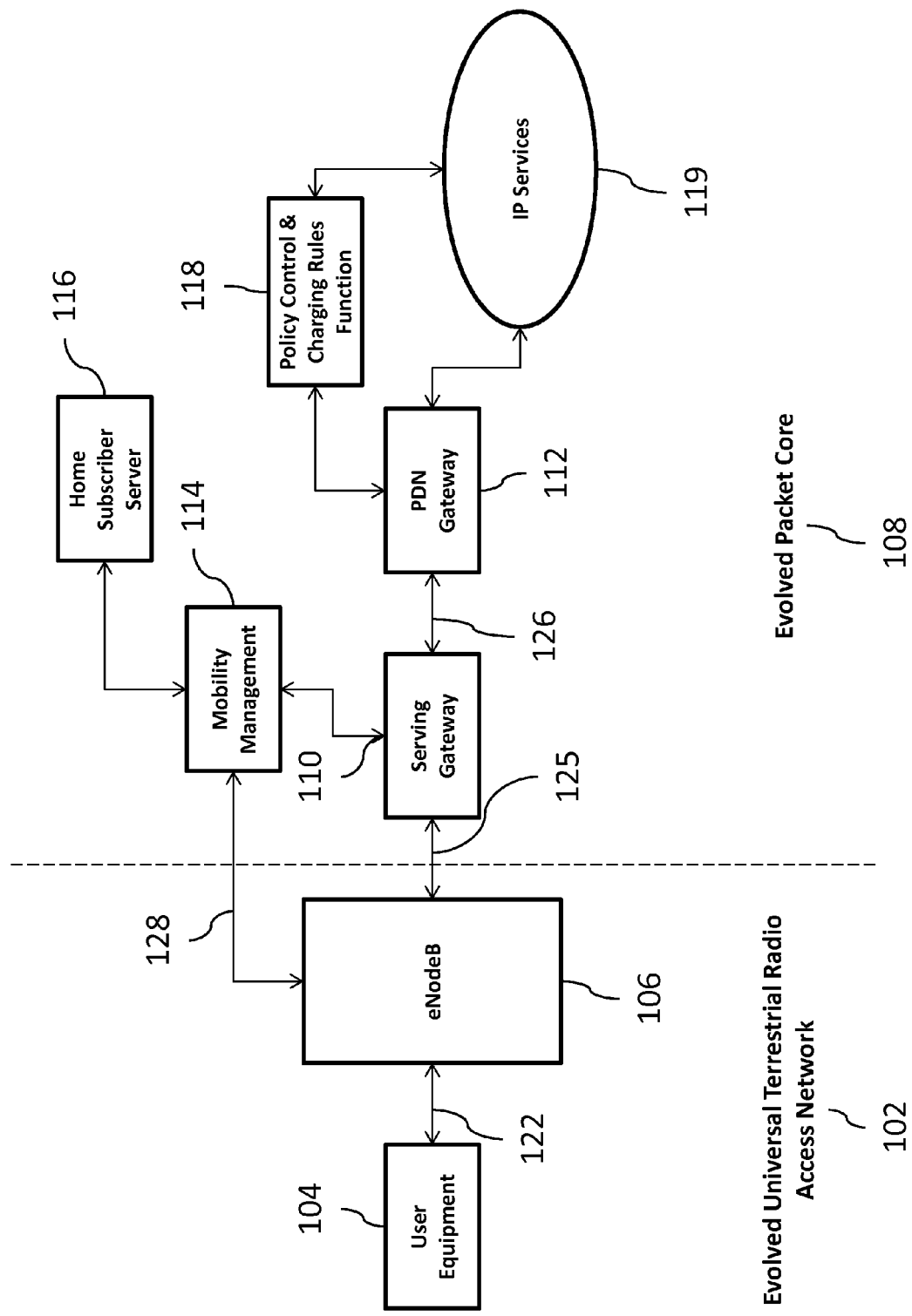

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1a, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1*a*). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QoS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1*a*).

II. eNodeB

Figure 1D:
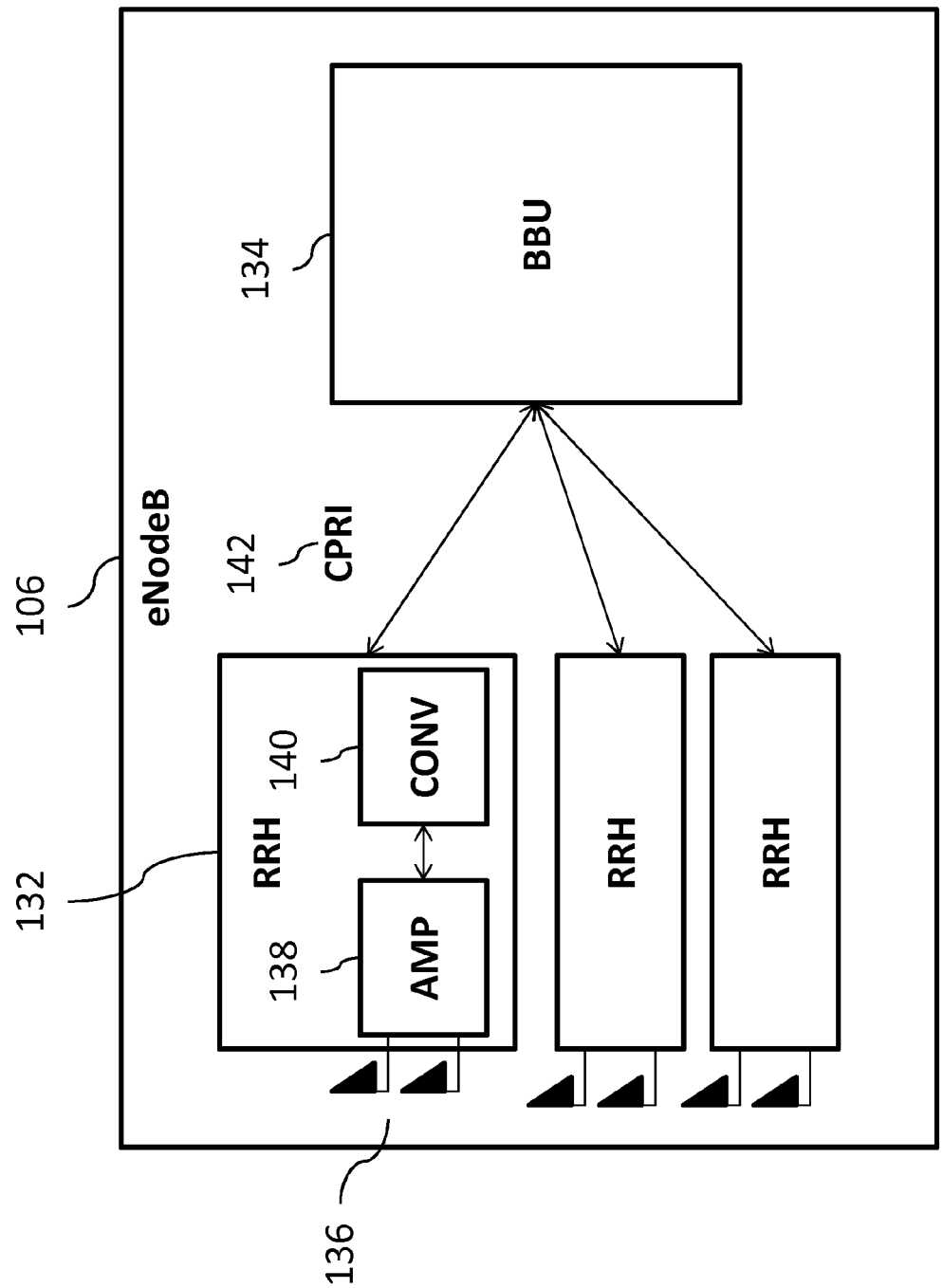

FIG. 1*d* illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI") 142 standard specification. The operation of the eNodeB 106 can be characterized using the following standard parameters (and specifications): radio frequency band (e.g., Band4, Band9, Band17), bandwidth (e.g., 5, 10, 15, 20 MHz), access scheme (e.g., downlink: OFDMA; uplink: SC-OFDMA), antenna technology (e.g., downlink: 2×2 MIMO; uplink: 1×2 single input multiple output ("SIMO")), number of sectors (e.g., 6 maximum), maximum transmission power (e.g., 60 W), maximum transmission rate (e.g., downlink: 150 Mb/s; uplink: 50 Mb/s), S1/X2 interface (e.g., 1000Base-SX, 1000Base-T), and mobile environment (e.g., up to 350 km/h). The BBU 134 can be responsible for digital baseband signal processing, termination of S1 line, termination of X2 line, call processing and monitoring control processing. IP packets that are received from the EPC 108 (not shown in FIG. 1*d*) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1*d*). Conversely, the RF signals that are received from user equipment 104 are amplified (using AMP 138) and converted (using CONV 140) to digital baseband signals for transmission to the BBU 134.

Figure 2:
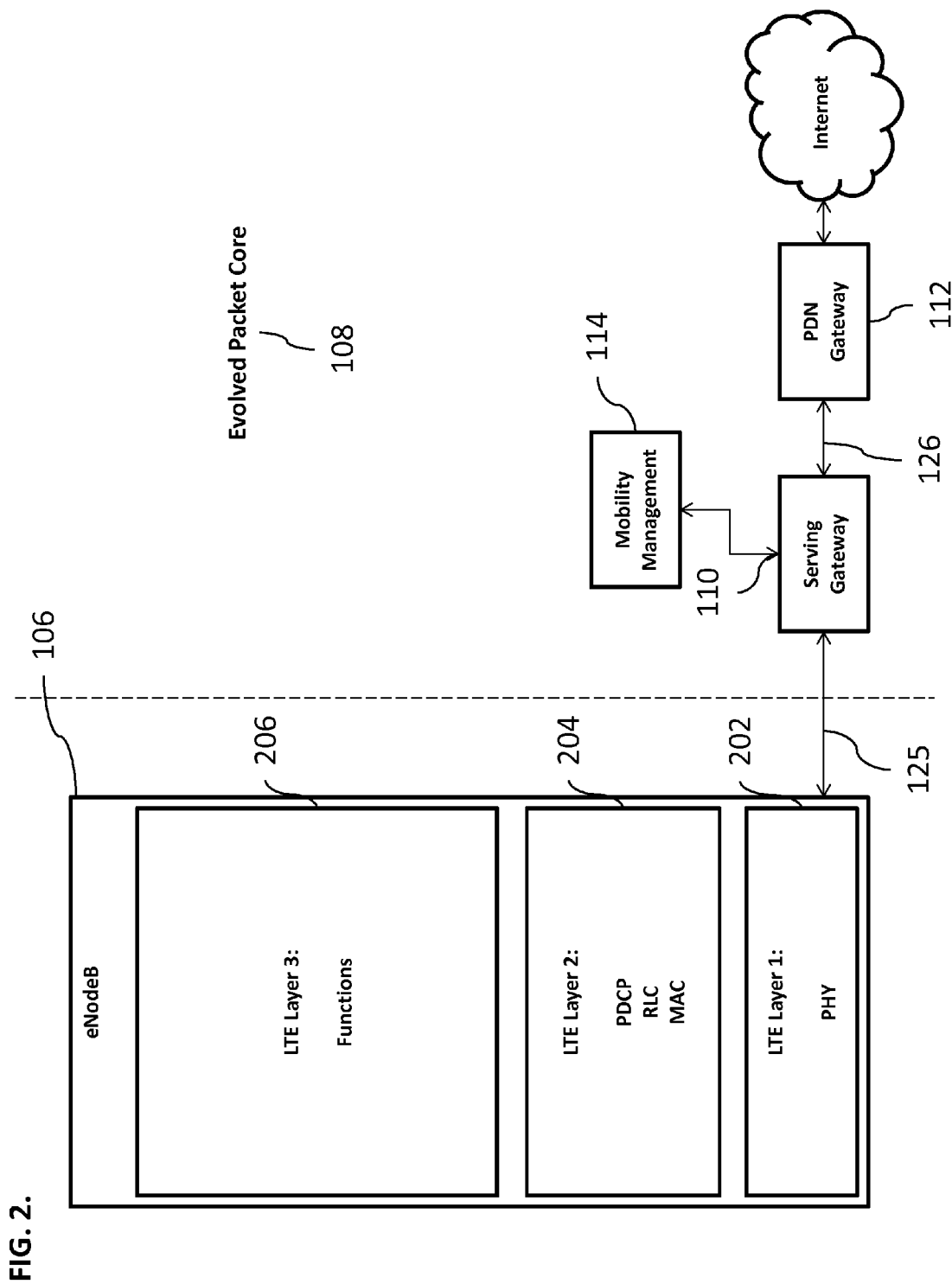
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1*d*, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

III. Intelligent LTE Radio Access Network

Figure 3:
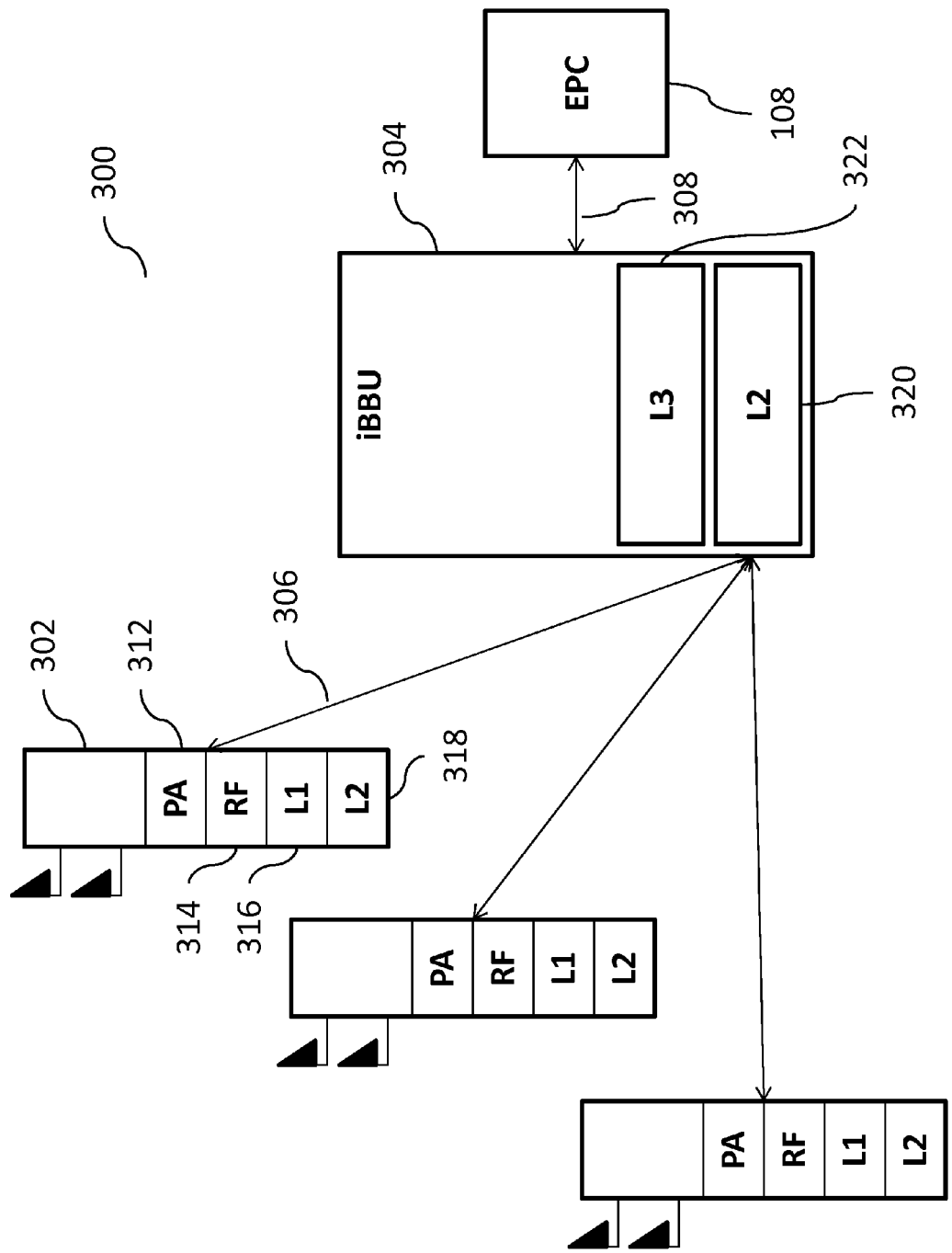
FIG. 3 illustrates an exemplary intelligent Long Term Evolution Radio Access Network, according to some implementations of the current subject matter.

FIG. 3 illustrates an exemplary system 300, according to some implementations of the current subject matter. The system 300 can be implemented as a centralized cloud radio access network ("C-RAN"). The system 300 can include at least one intelligent remote radio head ("iRRH") unit 302 and an intelligent baseband unit ("iBBU") 304. The iRRH 302 and iBBU 304 can be connected using Ethernet fronthaul ("FH") communication 306 and the iBBU 304 can be connected to the EPC 108 using backhaul ("BH") communication 308. The user equipment 104 (not shown in FIG. 3) can communicate with the iRRH 302.

In some implementations, the iRRH 302 can include the power amplifier ("PA") module 312, the radio frequency ("RF") module 314, LTE layer L1 (or PHY layer) 316, and a portion 318 of the LTE layer L2. The portion 318 of the LTE layer L2 can include the MAC layer and can further include some functionalities/protocols associated with RLC and PDCP, as will be discussed below. The iBBU 304 can be a centralized unit that can communicate with a plurality of iRRH and can include LTE layer L3 322 (e.g., RRC, RRM, etc.) and can also include a portion 320 of the LTE layer L2. Similar to portion 318, the portion 320 can include various functionalities/protocols associated with RLC and PDCP. Thus, the system 300 can be configured to split functionalities/protocols associated with RLC and PDCP between iRRH 302 and the iBBU 304.

IV. Backhaul Cost Reduction in Evolved Node B

The volume of data carried over a backhaul link (such as backhaul communication link 308 shown in FIG. 3) can be directly proportional to network operational costs of a network operator. Network operators typically use Synchronous Digital Hierarchy ("SDH") transmission systems, Plesiochronous Digital Hierarchy ("PDH") transmission systems, and super PDH transmission systems.

The SDH transmission system along with synchronous optical networking ("SONET") implement standardized protocols that transfer multiple digital bit streams over optical fiber using lasers or highly coherent light from light-emitting diodes. SDH/SONET use exact rates for transporting the data and are tightly synchronized across the entire network, using atomic clocks. The synchronization allows entire inter-country networks to operate synchronously, thereby reducing the amount of buffering required between elements in the network. Both SONET and SDH are used to encapsulate earlier digital transmission standards, such as PDH, and/or directly support either Asynchronous Transfer Mode ("ATM") and/or packet over SONET/SDH ("POS") networking. The bandwidth-flexible format of a SONET/SDH signal allows it to carry many different services in its virtual container ("VC"). The SONET/SDH transport containers allow delivery of a variety of protocols, including traditional telephony, ATM, Ethernet, and TCP/IP traffic.

The PDH is used in telecommunications networks to transport large quantities of data over digital transport equipment such as fiber optic and microwave radio systems, however, in the PDH, different parts of a network are not quite perfectly synchronized. PDH allows transmission of data streams that are nominally running at the same rate with some variation on the speed around a nominal rate.

In view of the operational costs associated with backhaul, network operators typically use various conventional backhaul optimization techniques to attempt to reduce such costs. One such technique is network offloading. Using this technique, some data traffic associated with uplink and downlink transmissions is identified somewhere between a radio network controller ("RNC") in a 3G network and a packet core network, and then offloaded to alternative routes to and from the Internet. In LTE, offloading can happen at the cell site. However, data traffic offloading in a RAN often requires network address translation ("NAT") (i.e., a network protocol used in IPv4 networks that allows multiple devices to connect to a public network using the same public IPv4 address) operation at the offloading location. Further, the offloaded data traffic has to remain anchored at the offloaded location in the network, thereby restricting mobility and data session relocation.

Figure 4:
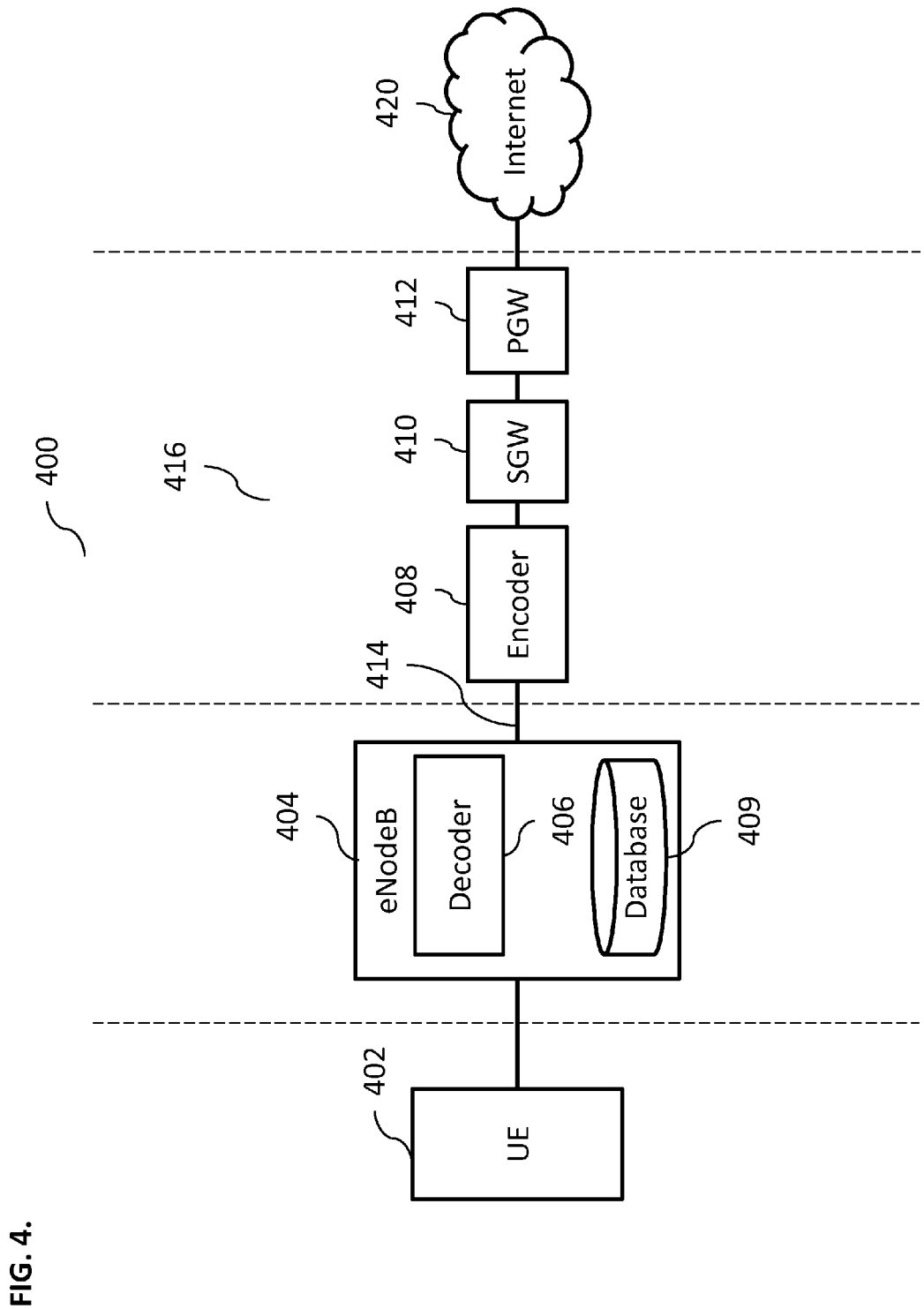
FIG. 4 illustrates an exemplary communications system that can reduce operational costs associated with a backhaul link, according to some implementations of the current subject matter.

FIG. 4 illustrates an exemplary communications system 400 that can reduce operational costs associated with a backhaul link, according to some implementations of the current subject matter. The system 400 can include a user equipment 402, a base station 404 (e.g., an eNodeB), and a core network 416. The user equipment 402 can communicate with the eNodeB 404. The eNodeB 404 can communicate with the core network 416 via a backhaul communications link 414. The core network 416 can be communicatively coupled to the Internet 420. The eNodeB 414 and the core network 416 can be similar to the respective components shown and discussed above in connection with FIGS. 1*a*-3. The eNodeB 414 can also include a decoder 406 and a database 409 for storing previously received content. In some implementations, the decoder can be a software module and/or any combination of hardware and/or software components that can be disposed in a base station (e.g., eNodeB 404). These components can be separate from other components of the base station and/or share components with other hardware and/or software disposed in the base station. In some implementations, the decoder 406 can include at least one processing unit and/or at least one memory. The decoder 406 can receive content and/or perform content insertion from a local data cache that can be included in the eNodeB 404. The content can be inserted after decoding payload signatures received from the encoder 408. The payload signatures can include values that can be pointers to content that the encoder 408 suppressed. In some implementations, the same content can be available in the local cache of the eNodeB 404 for the decoder 406 to lookup and insert after decoding a particular payload signature. The decoder 406 can also perform data redundancy elimination. The decoder 406 can also be a known decoder that can perform such data redundancy elimination. The previously received content can be content stored from previous sessions (e.g., user equipment 402 requesting various content from the Internet and the requested content being provided to the user equipment). The core network 416 can include an encoder 408, an S-gateway ("SGW") 410, and a packet gateway ("PGW") 412 as well as other components shown in and discussed above in connection with FIGS. 1*a*-3. In some implementations, the encoder 408 can be positioned between the eNodeB SGW 410 and the eNodeB 404, as shown in FIG. 4. The encoder 408 can be positioned anywhere in the core network 416 and/or outside of the network 416. In some implementations, the encoder 408 can be a software module and/or any combination of hardware and/or software components that can be disposed in the core network 416. These components can be separate from other components of the core network 416 and/or share components with other hardware and/or software disposed in the core network 416. The encoder 408 can include a software functionality that can create 0-10 byte signatures based on a generic hash function with input as the content payload. It can convey the signature to the decoder 406 over the backhaul link 414. If an unknown content is received, the encoder 408 can use chunk boundary setting to encode the payload into signatures. The chunk boundary can also be configurable. It can either be a fixed number of bytes (e.g., typically 512 bytes), and/or it can be set using a low-bandwidth network file system ("LBFS") based on Rabin-Karp fingerprinting algorithm.

Figure 5:
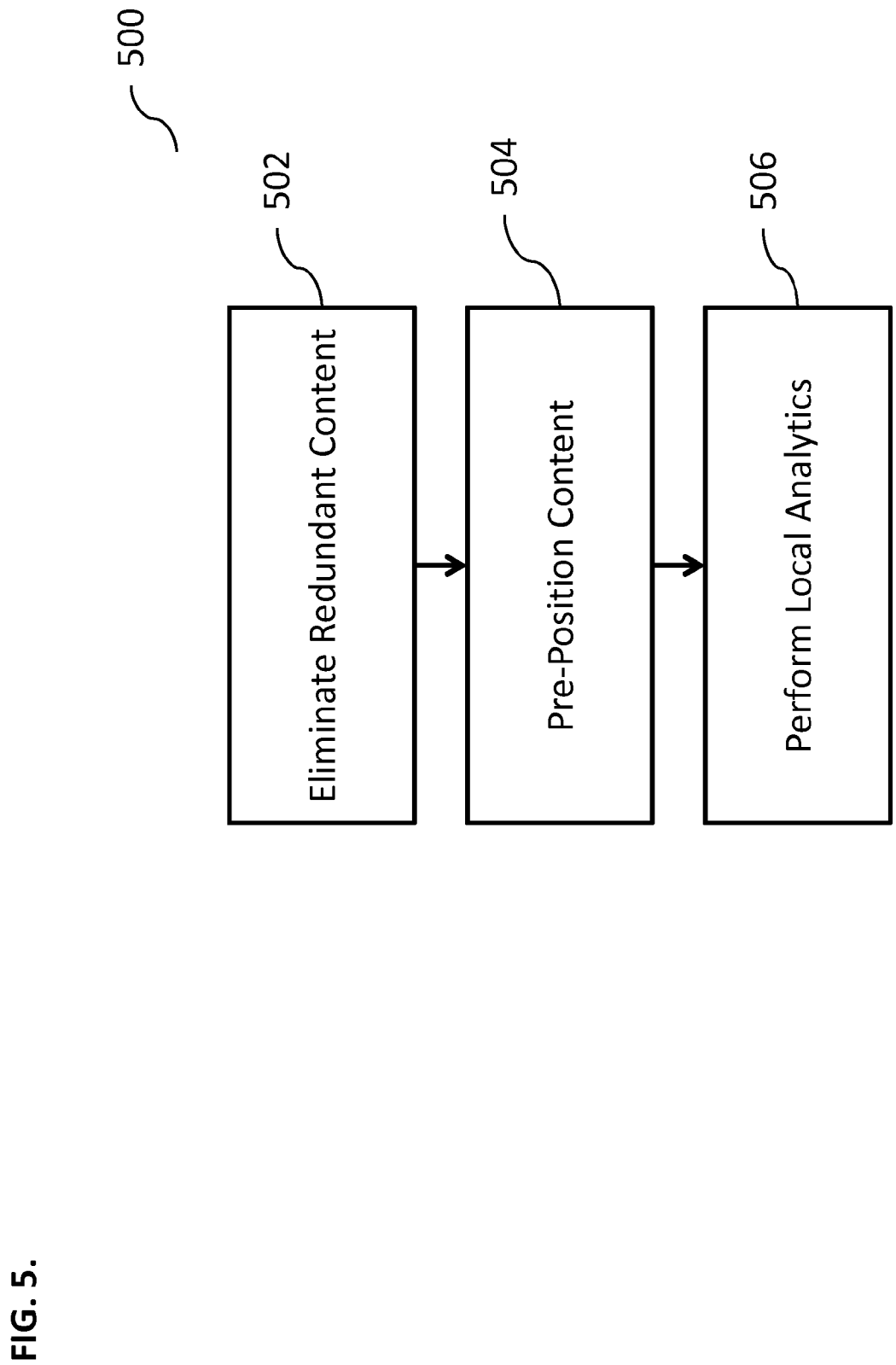
FIG. 5 is an exemplary flowchart illustrating a hybrid redundancy elimination process, including three phases: elimination of redundant content, pre-positioning of content, and performing local analytics, according to some implementations of the current subject matter.

In some implementations, to reduce the operational costs associated with a backhaul link, the current subject matter system 400 can implement a hybrid redundancy elimination process. FIG. 5 is an exemplary flowchart illustrating the hybrid redundancy elimination process 500, which can include three phases: elimination of redundant content 502, pre-positioning of content 504, and performing local analytics 506. These phases can be performed in any order and are not limited to the order shown in FIG. 5. Further, in some implementations, only some phases can be performed while others are not performed (e.g., phase 502 is performed while phases 504 and 506 are not performed). Each of these phases is discussed in further detail below.

During chunk-based elimination of redundant content phase 502, chunks of data having a predetermined size (which can be configured and/or determined by the network operator) can be inspected for repeated bit patterns. Such bit patterns can also be compared with the data that is stored in the database 409, located at eNodeB 414. The data stored in the database 409 can include data that can be previously received from the Internet (e.g., as a result of being previously requested by the user equipment 402 (or other user equipment)). In some implementations, the database 409 can be co-located at the encoder 406. The size of the database 409 can be configurable and it can depend on the hardware capacity of the eNodeB 404. The content of the database 409 can be stored based on a lifetime of the content caching policy that can be associated with the content, the eNodeB 404, and/or any other factors. In some implementations, the content caching lifetime can be determined based on a global parameter, based on per-content cache lifetime setting, and/or any other parameters. Upon expiry of the content caching lifetime, the stored content can be purged. The content database 409 can be structured using content index and content payload. The content index can be either the signature of the content that the encoder 408 can generate, and/or it can be a URL (e.g., http://youtube.com/content name). If a match between the newly received data pattern of repeating bits and the previously received data is found, a signature can be sent, which can uniquely represent the redundant data. The encoder 408 can generate the signature based on the received payload chunk. The signature can be a hash operation on the received chunk that is known to the decoder 406. In some exemplary implementations, the signature can have an output length set to 0-10 bytes.

In some implementations, the signature can be used as a "key" to the database 409 in the eNodeB 404 so that appropriate data can be used to populate the received data packet with the data that is stored in the database 409. Use of the signature for sending over the RAN backhaul links can reduce the volume of traffic that can be redundant. Cost savings associated with use of this technique can vary depending on the cell site location and usage patterns in the location of the cell site. For example, when a cell site is deployed in a residential area, where the endpoint devices are typically not mobile and the usage of the network is predictable, a vast majority of the content can be transported using this technique over the backhaul links only once, instead of many redundant transmissions. The same scenario can apply to the cell sites near an office area, near a commercial area, near a sports arena, near a restaurant, etc. In some implementations, most micro cell sites and pico-cell sites can be within this type of data traffic characterization.

During the content pre-positioning phase 504, a network operator can implement a content pre-positioning rule-set at a cell site based on its business relationship with content providers, advertisers, etc. The rule-set can be used to identify data that can be frequently requested by endpoint user devices (i.e., user equipment 402). For example, rule sets can include, but are not limited to, sports highlights, news digests, etc. Using the rule-set, data can be pre-positioned at the cell site. The data can be stored in the eNodeB 404.

In the content analytics phase 506, the eNodeB 404 can build a knowledge base for the network operator to make intelligent decisions about operational efficiency. The eNodeB 404 can gather backhaul link usage statistics and other performance metrics over different time intervals (e.g., bouncing busy hour, workdays and weekends, months, etc., and/or any other predetermined periods of time). This information can be used to generate various reports for each cell site. These reports can be used to understand local usage patterns. Based on these usage patterns, content can be pre-fetched by the eNodeB 404 and delivered to the end users on demand.

Figure 8:
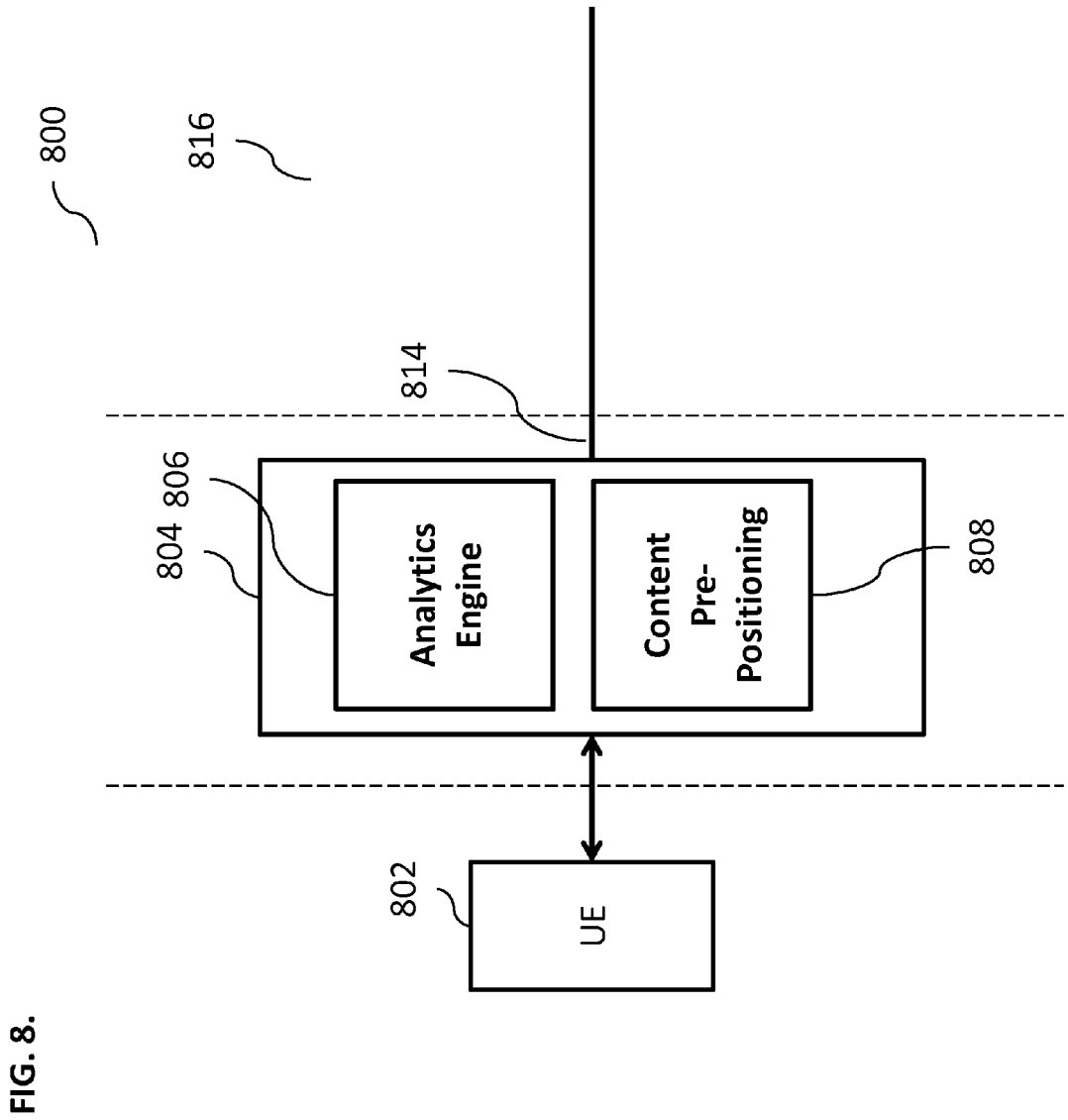
FIG. 8 illustrates an exemplary system that can provide a reduction in costs associated with backhaul connection, according to some implementations of the current subject matter.
Figure 9:
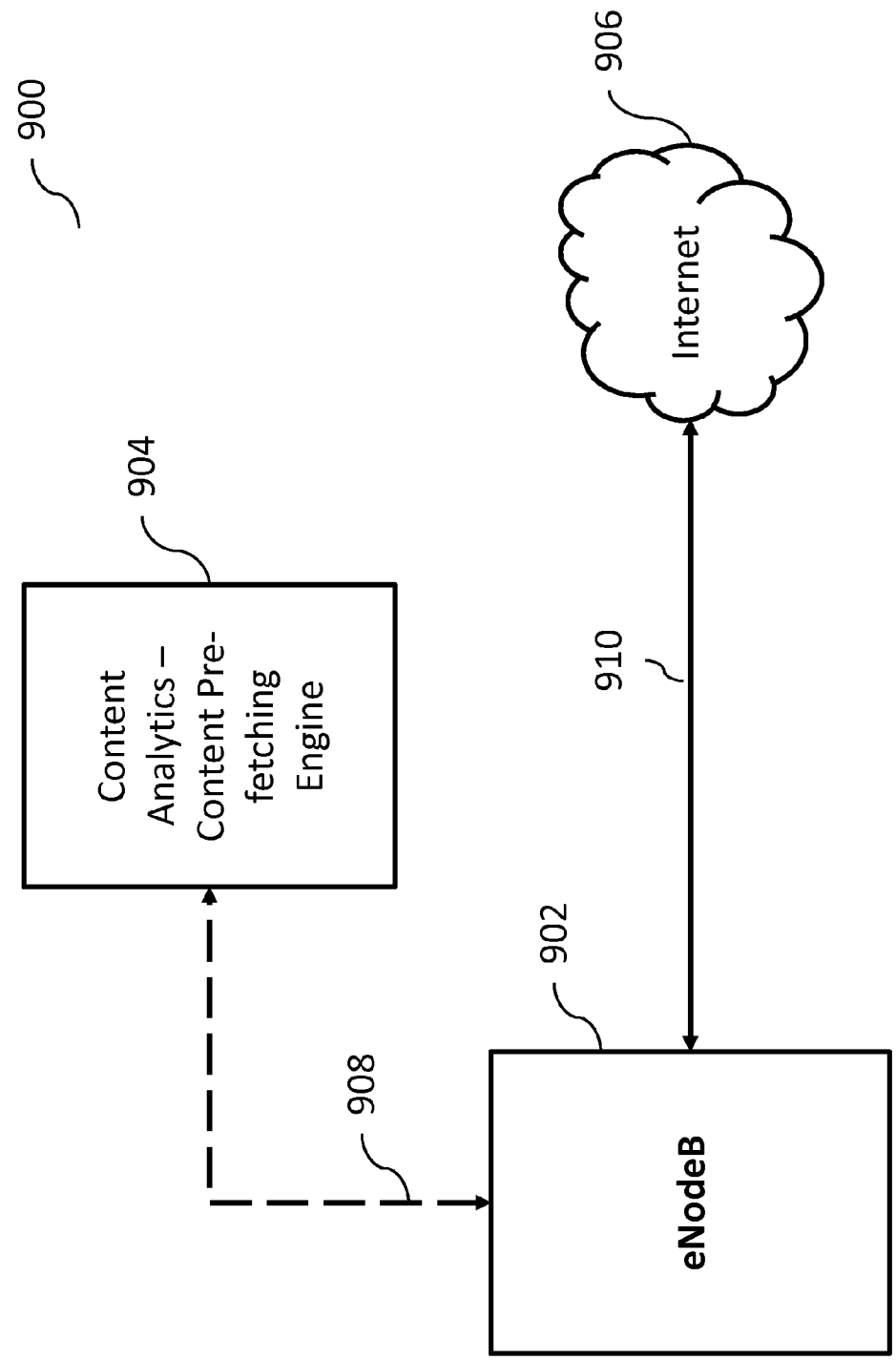
FIG. 9 illustrates an exemplary system for local analytics and pre-fetching of content, according to some implementations of the current subject matter.

FIG. 9 illustrates an exemplary system 900 that can perform content analytics and/or content pre-fetching, according to some implementations of the current subject matter. The system 900 can be disposed in a wireless communications environment and can include a base station, such as, an eNodeB 902. The eNodeB 902 can be similar to the eNodeB discussed above (and shown in FIGS. 4-8). The eNodeB 902 can communicate with the Internet 906 and can receive/transmit various data (including requests to fetch/obtain content, response to the requests for content, actual content, etc.) via a communications link 910. The content can be processed by the eNodeB 902 for the purposes of providing content to the user equipment (not shown in FIG. 9). In some implementations, the eNodeB 902 can communicate with a content analytics and/or content pre-fetching engine 904. The engine 904 can be located in the eNodeB 904 and/or can be communicatively coupled to the eNodeB 902. The engine 904 can be a software module and/or any combination of hardware and/or software components that can be disposed in the eNodeB 902 and/or outside of eNodeB 902. Some and/or all of these components can be separate from other components of the eNodeB 902 and/or share components with other hardware and/or software disposed in the eNodeB 902. In some implementations, the engine 904 and the eNodeB 902 can be configured to exchange various content analysis reports and statistics over a communications link 908. In some implementations, the engine 904 can perform analysis of various applications (e.g., email, web browser, etc.) that can request and/or use content that is provided from the Internet to the eNodeB 902. The analysis can include analysis of usage associated with a particular application, which can include identification and/or analysis of at least one of the following: a particular application, its type, users that use the application, type of content being requested by the application, etc. The data and/or metadata received for and/or generated as a result of this analysis can be stored in a memory location, which can include a database that can be included in the engine 904 and/or eNodeB 902.

In some implementations, the engine 904 can use the application usage analysis data to generate information about a cost-per-click ("CPC") and/or cost-per-1000-impressions ("CPM") data. The CPC and/or CPM data can be used to determine various parameters associated with effectiveness, efficiency, costs, etc. of using a particular application, including any costs of advertising, marketing, etc.

In some implementations, the application usage data and the CPC/CPM data can be used to generate key performance indicators ("KPI"). The KPIs can be indicative of how a particular application, along with any associated hardware and/or software is performing with regard to content being requested and/or received. The KPI can be used to analyze various parameters associated with services provided by the particular application and/or any hardware and/or software that may be associated with it.

The KPI data, application usage data, and/or CPC/CPM data can be supplied to a customer relationship management ("CRM") module that can also be part of the engine 904. The CRM module can generate various customer experience analytics data. The CRM data can provide current information of customer satisfaction with a particular application, which can be used for purposes of marketing, advertising, customer service, improvement of level of services, determination of additional services, etc.

In some implementations, the application usage data, the CPC/CPM data, KPI data, and/or CRM data can be compiled into a various reports and provided to the eNodeB 902. This reports can be supplied to service providers that can use it to determine how to improve quality of their services as well as for any other purposes.

In some implementations, in order to identify known content, such as sports clips, news digests etc., that is widely requested and/or viewed by users at any given eNodeB, in the stream of data, the current subject matter's hybrid redundancy elimination process can perform file-based similarity detection and chunk-based operation for dynamic, random content such as a content that is rarely requested and/or viewed by users at any given eNodeB. In some implementations, deep packet inspection ("DPI") and/or shallow packet inspection ("SPI") of the packets can be performed at the eNodeB 404.

A shallow packet inspection can be performed by inspecting one or more headers of the data packet to determine information associated with the data packet. For example, the shallow packet inspection can inspect an IP header of the data packet in order to determine the source IP address of the data packet. In some implementations, based on the results of the shallow packet inspection, a deep packet inspection can be performed by examining other layers of the data packet. For example, the deep packet inspection can include an inspection of one or more of layers 1-7 of open systems interconnect ("OSI") model data packet. In some implementations, the payload of a data packet can be inspected to determine what resource blocks should be assigned to the data packet.

Figure 6:
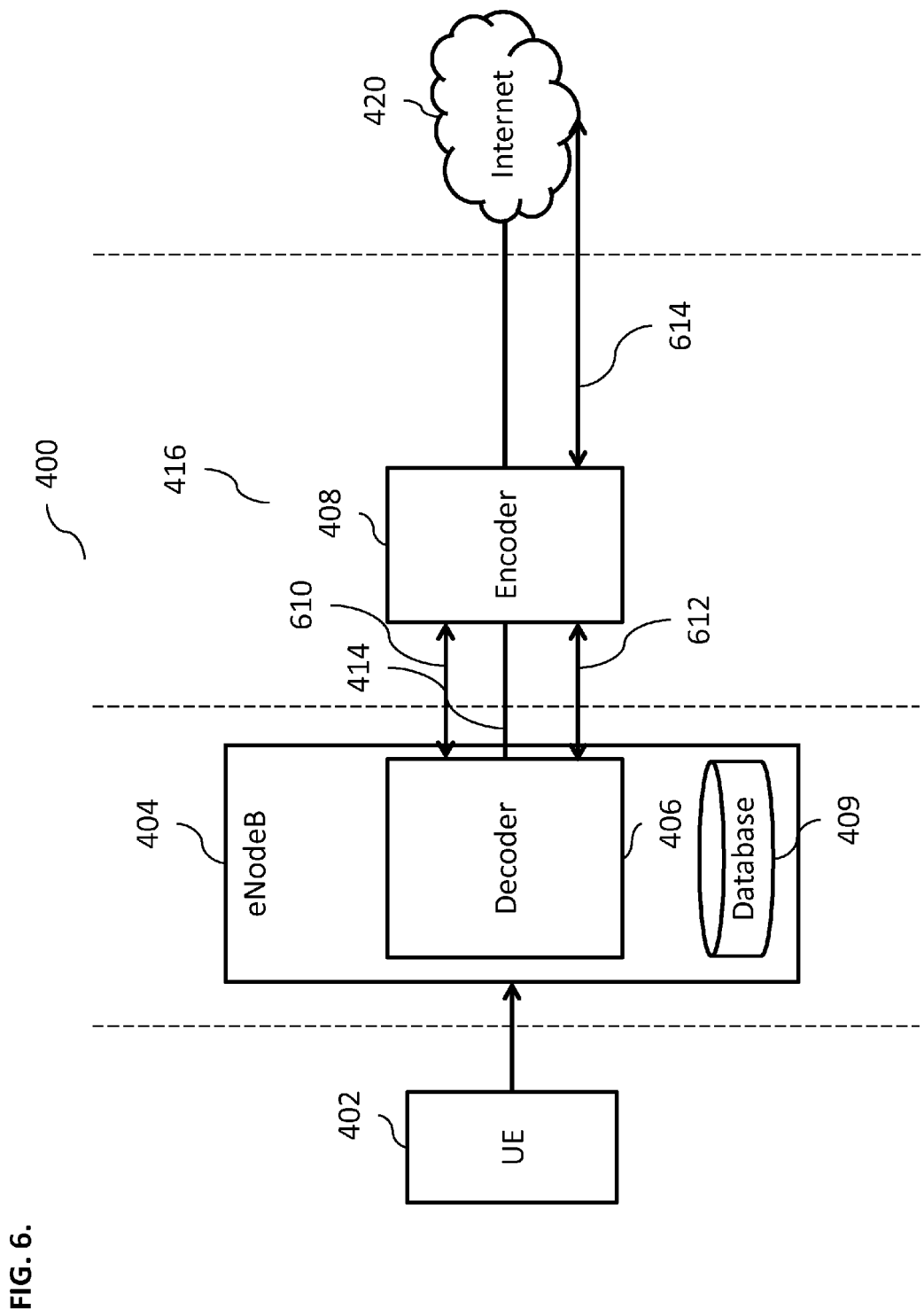
FIG. 6 illustrates additional detail of an exemplary communications system shown in FIG. 4, according to some implementations of the current subject matter.

FIG. 6 illustrates further detail of the system 400 shown in FIG. 4. As shown in FIG. 6, the eNodeB 404 can include the decoder 406. The core network 416 can include the encoder 408. The decoder 406 and the encoder 408 can communicate with one another via an optimized backhaul communications link 414. The decoder 406 and the encoder 408 can exchange content signatures 612. The decoder 406 can also forward local age-based content 610 to the encoder 408. The age-based content can include content that can be stored in the database 409 of the eNodeB 404 from a previous session that can be initiated by the user equipment 402. The age of the content can be determined based on the date and/or time that the content is supplied to the user equipment 402 and/or stored in the database 409. In some implementations, the content, whose age exceeded a certain time threshold (e.g., a day old content; an hour-old content, and/or any other time period etc.), can be purged from the database 409. The encoder 408 can also exchange actual content 614 with the Internet 420 (or any other communications network).

The decoder 406 can be software, hardware, and/or various combinations of hardware and/or software components that can be disposed at the eNodeB 404. The decoder 406 can be disposed within LTE Layer 3 of the eNodeB 404. The encoder 408 can also be software, hardware, and/or various combinations of hardware and/or software components. The database 409 can be software, hardware, and/or various combinations of hardware and/or software components that can be disposed at the eNodeB 404. The database 409 can be any time of memory and/or storage component that can allow storage of data temporarily and/or permanently.

In some implementations, the user equipment can initiate a request for content (e.g., a session) by sending HTTP GET/POST packets toward eNodeB 404. Upon receiving HTTP GET/POST packets from the user equipment 402, the eNodeB 404 can perform the SPI/DPI inspection procedures, as discussed above, on the incoming packets. The HTTP GET/POST packets can indicate desired action(s) to be performed on the identified resource, where the resource can be a server that stores a particular data and located in the Internet 420. In particular, the HTTP GET can request a representation of a specified resource and can only retrieve data but have no other effect. The HTTP POST can request that a server accept an entity enclosed in the request as a new subordinate of a web resource identified by a uniform resource identifier ("URI"). The data POSTed can include, for example, an annotation for existing resources; a message for a bulletin board, newsgroup, mailing list, or comment thread; a block of data resulting from a submission of a web form to a data-handling process; and/or an item to add to a database. The inspection can be performed by the decoder 406 at the eNodeB 404.

Once the decoder 406 determines what content is being requested by the user equipment 402, the decoder 406 can check in the database 409 at the eNodeB 404 whether that content has been already stored in the database 409, such as for example from a previous session. If the content is stored at the database 409, the decoder 406 can communicate with the encoder 408 at the core network 416 and can indicate that the requested content is stored in the database 409. In some implementations, the age of the stored content can be ascertained by the decoder 406 (and/or supplied by the database 409). Using the age information, the decoder 406 can determine whether or not the stored content can be used and/or provided to the user equipment 402.

The decoder 406 can provide the encoder 408 a flow identifier such as a set containing the IP and TCP/UDP header fields that can be extracted from the HTTP packets received from the user equipment 402. The decoder 406 can also indicate an age of the content stored in the database 409 to the encoder 408. Depending on the content aging policy in place, the encoder 408 can suppress entire payload of the content when it arrives on the downlink, and/or it can send signatures of the payload chunks to the decoder. The decoder 406 can then insert the content from its local storage and send the requested content's packet(s) to the user equipment 402. In some exemplary implementations, by performing this operation, payload chunks of approximately 500 bytes can either be suppressed, and/or hashed into a 10 bytes long signature which can be sent over the backhaul links. In some implementations, as shown in FIG. 6 and discussed above, the backhaul bandwidth gain can be approximately 98%-100% of the redundant flows.

In some implementations, the eNodeB 404, while processing the content (whether or not the content is destined for particular user equipment 402), can implement a learning phase as part of its hybrid redundancy elimination process. The eNodeB 404 can use the information obtained from packet inspection, content prepositioning and content analytics phases discussed above to determine how to manage requests for content received from the user equipment 402 and content received by the eNodeB 404 as a result of the requests. In some implementations, using packet inspection at various layers, the eNodeB 404 can determine whether or not a particular content flow can qualify for redundancy elimination. By way of a non-limiting example, if the content flow includes an end-to-end encrypted content, it can be unlikely that this content flow includes repeated payload chunks in other flows. Further, in some implementations, if the content being requested by the user equipment 402 falls under the content positioning profile of the eNodeB 404, the content can be cached at eNodeB 404 (e.g., in the database 409) and corresponding content signatures can be generated for the cached content, so that it can be easily retrieved next time it is requested. Additionally, the eNodeB 404 can perform local analysis of the content flows to determine local (e.g., user equipment specific) usage patterns. Hence, instead of caching all content flows, the eNodeB 404, as a result of the above learning phase, can cache content flows that are likely to be requested repeatedly in that local area served by the eNodeB 404, thereby optimizing storage on the eNodeB 404 and reducing backhaul costs.

In some implementations, the learning phase can be based on the known and unknown content. The known content is content can be pre-positioned in the eNodeB 404 based on content pre-positioning profile. The pre-positioning can occur substantially instantaneously and/or at pre-determined time interval(s). The unknown content can be ascertained using local analytics performed by eNodeB 404. This content can be very dynamic and unpredictable in nature. The unknown content can be pre-fetched by the eNodeB as soon as it makes the decision to pre-position (and/or fetch) the content based on analytics. Both of these types of content can then utilize file-based similarity detection.

In some implementations, the learning phase can be reduced to analyzing only the unknown content. Only this portion of traffic is dynamically learned (i.e., chunked, signature generated, and/or cached) in the eNodeB 404. For example, for a faster o(1) lookup performance, a combination of RAM and/or Flash memory can be used to store and compare the signatures. The actual payload can be cached in a local memory (e.g., database 409).

In some implementations, the chunk boundary can be configurable. It can either be fixed number of bytes (e.g., 512 bytes), and/or it can be set using a low-bandwidth network file system ("LBFS") based Rabin-Karp fingerprinting algorithm.

In some implementations, the current subject matter's hybrid redundancy elimination process can optimize backhaul link without breaking an end-to-end nature of the IP flows. Using this process, the encoder 408 and/or the decoder 406 do not terminate the IP sessions. Although the content can be locally cached at the eNodeB 404, the eNodeB 404 does not serve as the origin server of the content. Thus, the eNodeB 404 can re-populate the content based on received signatures and the decompressed TCP/IP and/or RTP/UDP/IP headers using standard ROHC header compression profiles.

Figure 7:
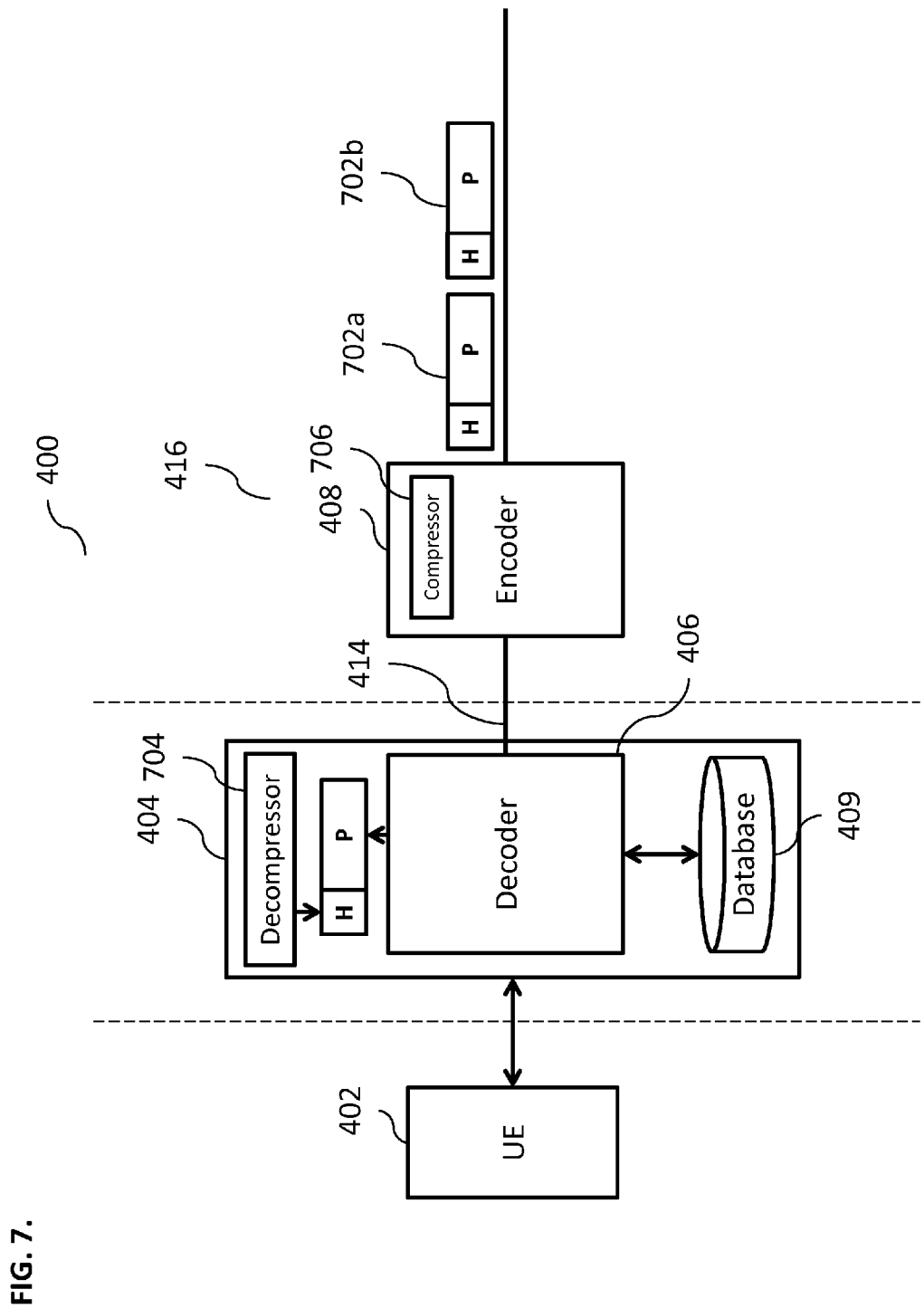
FIG. 7 illustrates further detail of an exemplary communications system shown in FIG. 4, according to some implementations of the current subject matter.

FIG. 7 illustrates additional detail of the system 400 shown in FIG. 4, with regard to the header compression. As shown in FIG. 7, each packet 702 (a, b) that arrives from the Internet at the encoder 408 can include a header component "H" and a payload component "P". The header H can include various information about the packet, including its source, destination, etc., and the payload P can contain data requested by the user equipment 402. The packets can be compressed by the compressor 706 at the encoder 408 and forwarded to the decompressor 704 at the decoder 406 at the eNodeB. The eNodeB 404 can also include a decompressor 704 that can decompress compressed packets 702 and forward them to the decoder 406 so that the hybrid redundancy elimination process can be performed.

In some implementations, in the event of the encoder 408 failure, the packets can be sent w/o header compression and/or signature generation. Upon detecting the encoder 408 failure, the eNodeB 404 can disable hybrid redundancy elimination process for the received data flow, and proceed with normal packet processing (i.e., without performing the phases of the process 500 shown in FIG. 5). In some implementations, upon disabling the hybrid redundancy elimination function, the encoder 408 can send the payload and header bytes as is to the decoder 406 over the backhaul links 414. The decoder 406 can then bypass any decoding operation and can send the bytes as is to the user equipment 402. In the event of data loss during this process, the transport layer can determine whether re-transmission of lost data may be required and perform such re-transmission, if necessary. In the event that the chunk boundaries do not fall at the IP packet boundary, the ROHC compressed packet can contain signatures of all the chunks in a given packet.

If the decoder 406 fails to reproduce the chunk referred to by a received signature, the decoder 406 can send a message to the encoder 408 to abort the hybrid redundancy elimination process and initiate sending full packets over the backhaul link. The packets that are lost due to such failure can be recovered via TCP and/or upper layer retransmissions depending on the type of an application.

FIG. 8 illustrates an exemplary system 800 that can provide a reduction in costs associated with backhaul connection, according to some implementations of the current subject matter. The system 800 can be similar to the system 400 shown in FIG. 4. In particular, the system 800 can include a base station 804 (e.g., an eNodeB, which can be similar to the eNodeB 404 shown in FIG. 4) communicatively coupled to a user equipment 802 and a core network 816. The eNodeB 804 can include an analytics engine module 806 and a content pre-positioning module 808, which can perform phases 506 and 504, respectively, as shown in FIG. 5, in order to reduce backhaul costs.

The analytics module 806 can be software, hardware, and/or various combinations of hardware and/or software components that can be disposed at the eNodeB 804. The module 806 can be disposed within LTE Layer 3 of the eNodeB 804 and/or at any other layer of the eNodeB 804. The pre-positioning module 808 also can be software, hardware, and/or various combinations of hardware and/or software components that can be disposed at the eNodeB 804. Similar to the module 806, the module 808 can be disposed within LTE Layer 3 of the eNodeB 804 and/or at any other layer of the eNodeB 804.

The analytics engine module 806 can perform analysis of the content that is requested by the user equipment 802 and/or received from the core network 816. The analytics engine module 806 can analyze requests from the user equipment 802 and/or content received from the core network 816 (such as by using SPI/DPI techniques discussed above) and determine at least one of the following parameters relating to the content: usage statistics, trends, popularity index, etc.

Figure 10:
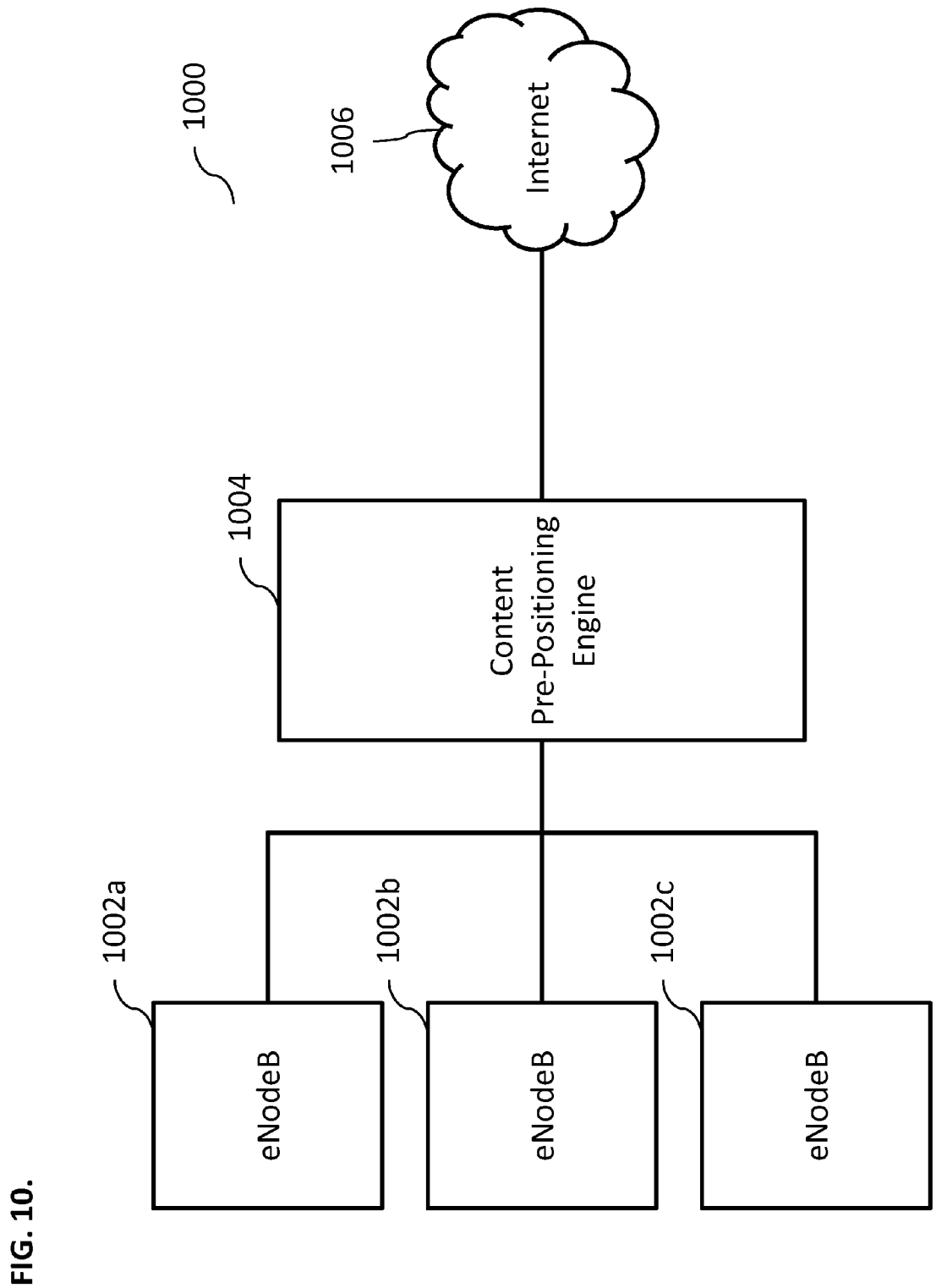
FIG. 10 illustrates an exemplary system for profile based pre-positioning of content, according to some implementations of the current subject matter.

FIG. 10 illustrates an exemplary system 1000 for performing profile-based content pre-positioning, according to some implementations of the current subject matter. The system 1000 can include a plurality of base stations (e.g., eNodeBs) 1002(a, b, c) that can be configured to receive content from the Internet 1006. In some implementations, a content pre-positioning engine 1004 can be communicatively coupled to the eNodeBs 1002. The engine 1004 can be a software module and/or any combination of hardware and/or software components that can be disposed in the eNodeBs 1002 and/or outside of eNodeBs 1002. Some and/or all of these components can be separate from other components of the eNodeBs 1002 and/or share components with other hardware and/or software disposed in the eNodeBs 1002. In some implementations, the engine 1004 can receive various data and/or metadata associated with a content profile and perform its analysis. The content profile data can include a location profile, a demographic profile, a user density profile, a usage/subscription profile, a business profile, an advertising profile, and/or any other profiles. In some exemplary, non-limiting implementations, the location profile can include various categories of location (e.g., residential, office, etc.). In some exemplary, non-limiting implementations, the demographic profile can include various range data that can be associated with user's income, and/or any other user data. In some exemplary, non-limiting implementations, the user density profile can include information about how densely a particular geographic location is populated (e.g., urban location, suburban location, remote location, etc.). This information can also be expressed in ranges (e.g., less than one 100,000, more than a million, etc.). In some exemplary, non-limiting implementations, the usage/subscription profile can be indicative of a list of application packages that users can and/or are commonly subscribe to. In some exemplary, non-limiting implementations, the business profile can be indicative of a list of business, sales, etc. promotions that can be and/or are made available to users. In some exemplary, non-limiting implementations, the advertising profile can include a list of advertisements offered to users and/or times when such advertisements are available to users.

In some implementations, the usage statistics parameters can indicate which application, content, time, location, user equipment, etc. that requested and/or received a particular content (e.g., a web browser on the user's equipment requesting a Java script as a result of the user selecting (such as by user clicking on the user interface of the user equipment) a particular content at 12:00 PM). The trend parameter can indicate behavior of the user using particular user equipment as it relates to other content (e.g., a website accessed by the user using the user equipment). The trend parameter can also indicate whether the user behavior is predictable (e.g., user accessing the same content from the same location on the same website) and/or changing (e.g., user accessing different content from the same website at different periods of time). The trend parameter can also indicate whether the change in behavior is due to the changes in the content being requested/delivered, user equipment, location, time of day, etc. The popularity index parameter can be used to rank long tail content in terms of repeated requests. In some implementations, the long tail content can include a large number of contents available in the Internet and that are not commonly accessed by users. Users, while performing regular web browsing, can occasionally access and view such content.

In some implementations, the analytics engine module 806 can gather statistics about the content being requested/delivered continuously, automatically, periodically, manually, upon request, and/or in any other way. The module 806 can gather all of the above information about the content being requested/delivered and/or any portion of the information. The gathered information can be stored in memory and/or any other storage location at the eNodeB 804 (e.g., a database 409 shown in FIG. 4). The information can be organized in any desired fashion. The information can also be easily retrieved upon a request from one or more components in the eNodeB 804.

In some implementations, based on the gathered information, some content that can potentially be requested by the user equipment can be pre-fetched and/or pre-positioned for delivery to the user equipment. Such pre-fetching of the content can be based on the popularity of a particular content (e.g., user equipment requesting the same content more often than other content), usage of a particular content, importance of the content, etc. Some of the benefits of content pre-fetching can include having a popular content fetched once over the backhaul link and served from local cache (e.g., local memory and/or storage location) in the eNodeB 804 for repeated download requests from various users. This can save on cost of the backhaul and improve quality of experience due to instantaneous content delivery to the user equipment 802 from local cache in the eNodeB 804. In some implementations, the analysis can be performed by inspecting the requests and responses for various content via the eNodeB over a predetermined period of time. The analysis can indicate a type of content that is being requested, accessed, and/or viewed by users the most via the eNodeB. Based on the analysis, a list of content can be generated for pre-fetching from a server where the content can be stored in the Internet or in a content delivery network. The content fetching function can generate a generic content request, e.g. HTTP GET towards the content server storing the requested content, then receive the requested content, and store the content in a local cache (e.g., in the eNodeB). This process can be performed automatically and without relying on a user to make a request for the content.

In some implementations, content pre-fetching can be performed using content pre-positioning module 808 at the eNodeB 804. The pre-positioning module 808 can store (or pre-position, pre-fetch, etc.) frequently requested content, well-known content, long-tail content, and/or any other content at the one or more eNodeB 808. In some implementations, well-known content pre-positioning can be performed based on a local profile and a service provider's (SP's) business model. Pre-positioning of the long-tail content can be based on local analytics.

In some implementations, local profiles can include at least one of the following factors: a location profile, a demographic profile, a user density profile, usage/subscription profile, a business profile, an advertising profile, and so forth. The location profile can include, for example but not limited to, whether content being requested by a user equipment located in a residential and/or a commercial area. Additionally, it can be determined whether the user is an individual user and/or a commercial user (e.g., a corporation). The demographic profile can include, for example but is not limited to, an age, a gender, an income level, etc. of the user associated with the user equipment. The user density profile can include information about a number of user equipments that are in a particular geographic location where content is/was requested/delivered to. The usage/subscription profile can include information about specific content packages that are/were requested/delivered to user equipments. The business profile can include information about a particular business (e.g., name, address, promotions, etc.). The advertising profile can include information about specific advertisements (including, locations, times, etc. of where, when, presented, etc.) that can be presented to users and/or can be associated with content being requested/delivered to the user (as shown and discussed above in connection with FIG. 10).

In some implementations, the pre-positioning of long-tail content can be based on analytics gathered at the eNodeB 808 over large sets of data that the eNodeB 808 can transport over a particular period of time. The eNodeB 808 can determine whether repeated content is being requested during a predetermined number of times, and can further determine whether fetch the content and store it at the eNodeB 808. In some implementations, a counter can be used to count a number of times a given content is requested over a predetermined period of time (e.g., 1 hour). If the counter exceeds a predetermined threshold (e.g., 5 times), the content can be marked for pre-fetching and storing in the eNodeB.

In some implementations, one or more eNodeBs can perform content analysis and/or pre-positioning of content. Specific content can be analyzed and/or pre-positioned by a particular eNodeB. Further, one eNodeB can request other eNodeBs to analyze and/or pre-position various content.

Figure 11:
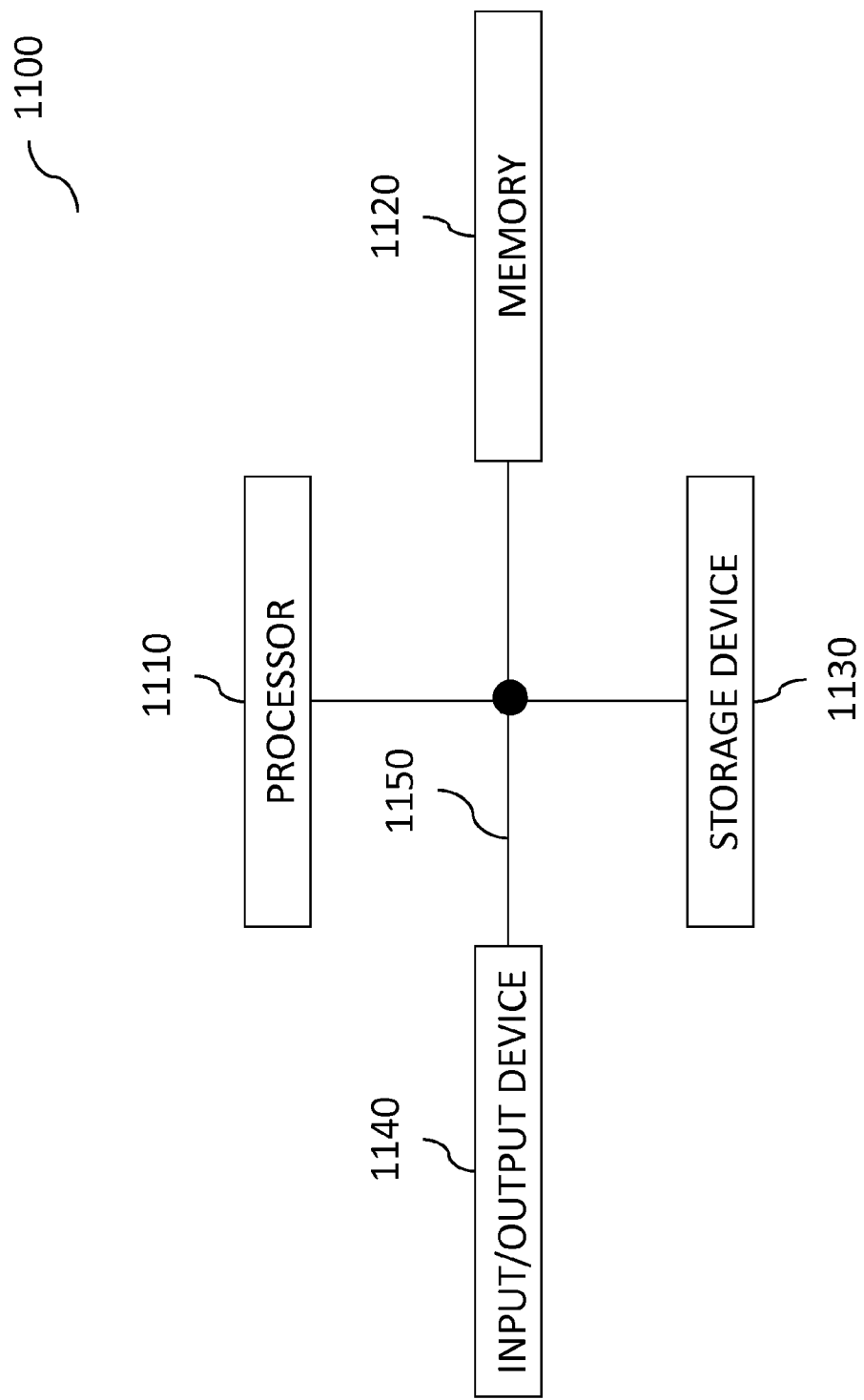
FIG. 11 illustrates an exemplary system, according to some implementations of the current subject matter.

In some implementations, the current subject matter can be configured to be implemented in a system 1100, as shown in FIG. 11. The system 1100 can include one or more of a processor 1110, a memory 1120, a storage device 1130, and an input/output device 1140. Each of the components 1110, 1120, 1130 and 1140 can be interconnected using a system bus 1150. The processor 1110 can be configured to process instructions for execution within the system 600. In some implementations, the processor 1110 can be a single-threaded processor. In alternate implementations, the processor 1110 can be a multi-threaded processor. The processor 1110 can be further configured to process instructions stored in the memory 1120 or on the storage device 1130, including receiving or sending information through the input/output device 1140. The memory 1120 can store information within the system 1100. In some implementations, the memory 1120 can be a computer-readable medium. In alternate implementations, the memory 1120 can be a volatile memory unit. In yet some implementations, the memory 1120 can be a non-volatile memory unit. The storage device 1130 can be capable of providing mass storage for the system 1100. In some implementations, the storage device 1130 can be a computer-readable medium. In alternate implementations, the storage device 1130 can be a floppy disk device, a hard disk device, an optical disk device, a tape device, non-volatile solid state memory, or any other type of storage device. The input/output device 1140 can be configured to provide input/output operations for the system 1100. In some implementations, the input/output device 1140 can include a keyboard and/or pointing device.

Figure 12:
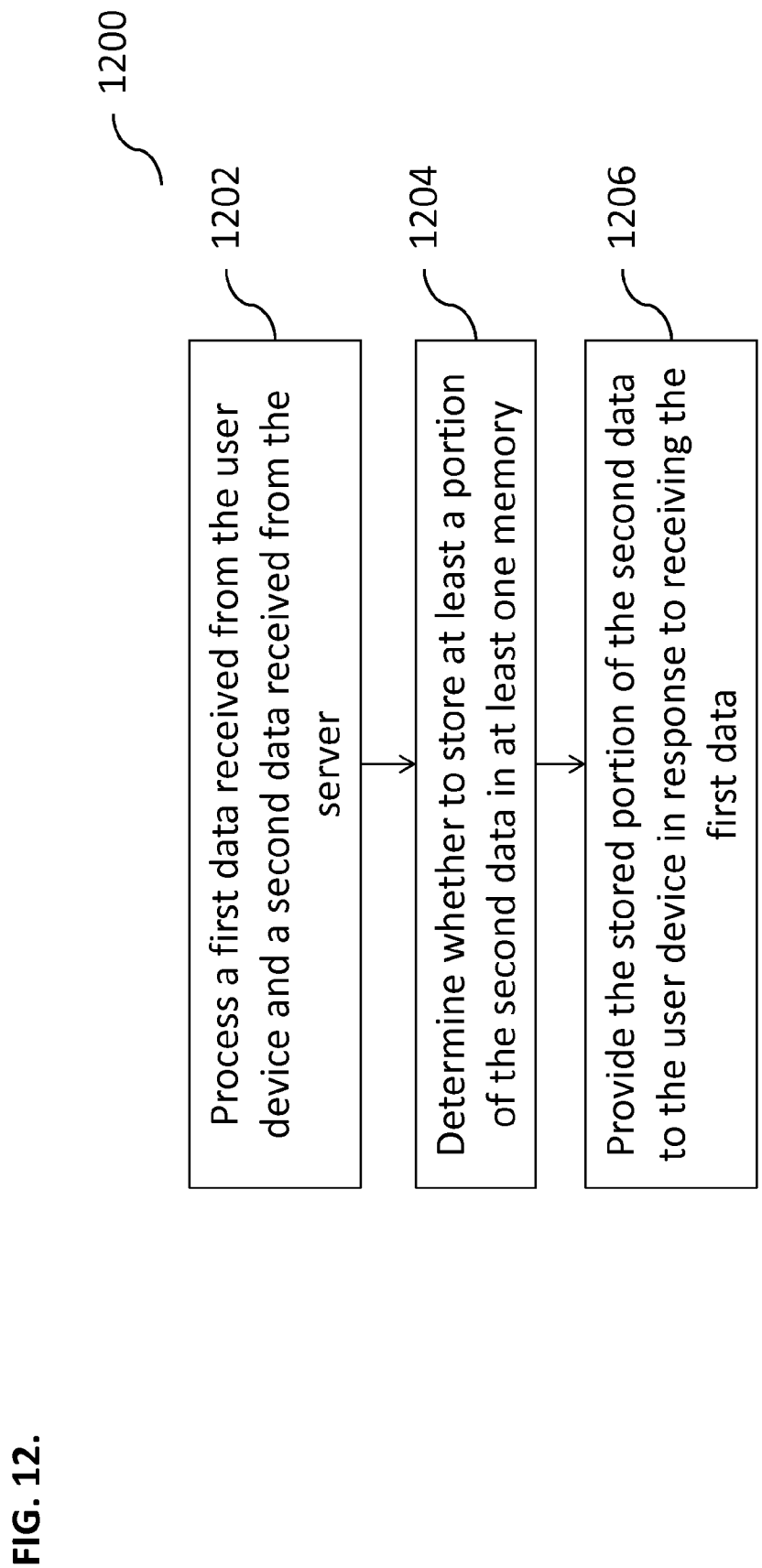
FIG. 12 illustrates an exemplary method, according to some implementations of the current subject matter

FIG. 12 illustrates an exemplary method 1200 for transmission of data packets between a user device and a server, according to some implementations of the current subject matter. At 1202, a first data received from the user device and a second data received from the server can be processed. This operation can be performed by a base station (e.g., an eNodeB as discussed above in connection with FIGS. 4-10). At 1204, a determination can be made whether to store at least a portion of the second data in at least one memory. Based on the determination, the portion of the second data can be stored in the at least one memory. At 1206, the stored portion of the second data can be provided (e.g., by the eNodeB) to the user device in response to receiving the first data.

In some implementations, the current subject matter can include one or more of the following optional features. The method can further include analyzing content of the second data to determine whether the second data includes at least one redundant data content, and deleting the at least one redundant data content from the at least one memory. In some implementations, the analysis of the content of the second data can include performing at least one of the following: a shallow packet inspection of at least one data packet in the second data, and a deep packet inspection of at least one data packet in the second data. In some implementations, the analysis of the content of the second data can include performing analysis based on at least one of the following factors: usage statistics of the second data, at least one trend associated with the second data, a popularity of the second data, application requesting the second data, content of the second data, time when the second data is requested by the user device and/or delivered to the user device, location of the user device, user device information, and a predictability of a usage of the second data by the user device.

In some implementations, the stored portion of the second data can be provided based on the age of the stored portion of the second data.

In some implementations, the method can include obtaining at least a portion of the second data for storage in the eNodeB base station. In some implementations, the method can include obtaining the at least a portion of the second data without receiving a request to obtain the at least a portion of the second data from the user device. In some implementations, the method can include obtaining the at least a portion of the second data based on at least one communication with at least one of the following: the user device and a plurality of user devices.

In some implementations, a decoder module can perform analysis of the second data based on a payload signature associated with the second data, the payload signature including at least one pointer to a storage location of the stored portion of the second data. The payload signature can be received from an encoder module, the decoder module is configured to communicate with the encoder module. The payload signature can be determined based on a chunk boundary of the second data.

In some implementations, the stored portion of the second data can be stored in the at least one memory for a predetermined period of time. Upon expiration of the predetermined period of time, the stored portion of the second data can be purged from the at least one memory.

In some implementations, the method can include performing analysis of a content the second data based on at least one of the following: an application usage parameter associated with an application generating and/or using the content, a cost-per-click parameter associated with the content, a cost-per-thousand-impressions parameter associated with the content, a key performance indicator associated with the content, and a customer relationship management parameter associated with the content.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A device for transmission of data between a user device and a server, the device comprising:
   at least one memory; and
   at least one processor operatively coupled to the memory, the at least one processor being configured to:
      process a first data received from the user device and a second data received from the server;
      determine whether to store at least a portion of the second data in the at least one memory, and based on the determination, store the at least a portion of the second data in the at least one memory, wherein the at least a portion of the second data is stored based on a lifetime of content caching policy associated with the at least a portion of the second data and in accordance with content signature and content payload associated with the at least a portion of the second data; and
      provide, based on the content signature and the content payload, the stored portion of the second data to the user device in response to receiving the first data.

2. The device according to claim 1, wherein the at least one processor is being configured to
   analyze content of the second data to determine whether the second data includes at least one redundant data content; and
   delete the at least one redundant data content from the at least one memory.

3. The device according to claim 2, wherein the analysis of the content of the second data includes performing at least one of the following: a shallow packet inspection of at least one data packet in the second data, and a deep packet inspection of at least one data packet in the second data.

4. The device according to claim 2, wherein the analysis of the content of the second data includes performing analysis based on at least one of the following factors: usage statistics of the second data, at least one trend associated with the second data, a popularity of the second data, application requesting the second data, content of the second data, time when the second data is requested by the user device and/or delivered to the user device, location of the user device, user device information, and a predictability of a usage of the second data by the user device.

5. The device according to claim 1, wherein the stored portion of the second data is provided based on the age of the stored portion of the second data.

6. The device according to claim 1, further comprising an evolved node (eNodeB) base station, the eNodeB base station comprising the at least one processor and the at least one memory.

7. The device according to claim 6, wherein the at least one processor is being configured to obtain at least a portion of the second data for storage in the eNodeB base station.

8. The device according to claim 7, wherein the at least one processor is being configured to obtain the at least a portion of the second data without receiving a request to obtain the at least a portion of the second data from the user device.

9. The device according to claim 7, wherein the at least one processor is being configured to obtain the at least a portion of the second data based on at least one communication with at least one of the following: the user device and a plurality of user devices.

10. The device according to claim 1, further comprising a decoder module is configured to perform analysis of the second data based on a payload signature associated with the second data, the payload signature including at least one pointer to a storage location of the stored portion of the second data;
wherein the payload signature is received from an encoder module, the decoder module is configured to communicate with the encoder module.

11. The device according to claim 10, wherein the payload signature is determined based on a chunk boundary of the second data.

12. The device according to claim 1, wherein the stored portion of the second data is stored in the at least one memory for a predetermined period of time;
wherein, upon expiration of the predetermined period of time, the stored portion of the second data is purged from the at least one memory.

13. The device according to claim 1, wherein the at least one processor performs analysis of a content the second data based on at least one of the following: an application usage parameter associated with an application generating and/or using the content, a cost-per-click parameter associated with the content, a cost-per-thousand-impressions parameter associated with the content, a key performance indicator associated with the content, and a customer relationship management parameter associated with the content.

14. A computer-implemented method for transmission of data between a user device and a server, the method comprising:
processing a first data received from the user device and a second data received from the server;
determining whether to store at least a portion of the second data in at least one memory, and based on the determining, storing the at least a portion of the second data in the at least one memory, wherein the at least a portion of the second data is stored based on a lifetime of content caching policy associated with the at least a portion of the second data and in accordance with content signature and content payload associated with the at least a portion of the second data; and
providing, based on the content signature and the content payload, the stored portion of the second data to the user device in response to receiving the first data;
wherein at least one of the processing, the determining, and the providing is performed by at least one processor of at least one computing system.

15. The method according to claim 14, further comprising analyzing content of the second data to determine whether the second data includes at least one redundant data content; and
deleting the at least one redundant data content from the at least one memory.

16. The method according to claim 15, wherein the analysis of the content of the second data includes performing at least one of the following: a shallow packet inspection of at least one data packet in the second data, and a deep packet inspection of at least one data packet in the second data.

17. The method according to claim 15, wherein the analysis of the content of the second data includes performing analysis based on at least one of the following factors: usage statistics of the second data, at least one trend associated with the second data, a popularity of the second data, application requesting the second data, content of the second data, time when the second data is requested by the user device and/or delivered to the user device, location of the user device, user device information, and a predictability of a usage of the second data by the user device.

18. The method according to claim 14, wherein the stored portion of the second data is provided based on the age of the stored portion of the second data.

19. The method according to claim 14, wherein an evolved node (eNodeB) base station performs at least one of the processing, the determining, and the providing, the eNodeB base station comprising at least one processor and the at least one memory.

20. The method according to claim 19, further comprising obtaining at least a portion of the second data for storage in the eNodeB base station.

21. The method according to claim 20, further comprising obtaining the at least a portion of the second data without receiving a request to obtain the at least a portion of the second data from the user device.

22. The method according to claim 20, further comprising obtaining the at least a portion of the second data based on at least one communication with at least one of the following: the user device and a plurality of user devices.

23. The method according to claim 14, wherein a decoder module performs analysis of the second data based on a payload signature associated with the second data, the payload signature including at least one pointer to a storage location of the stored portion of the second data;
wherein the payload signature is received from an encoder module, the decoder module is configured to communicate with the encoder module.

24. The method according to claim 23, wherein the payload signature is determined based on a chunk boundary of the second data.

25. The method according to claim 14, wherein the stored portion of the second data is stored in the at least one memory for a predetermined period of time;
wherein, upon expiration of the predetermined period of time, the stored portion of the second data is purged from the at least one memory.

26. The method according to claim 14, further comprising performing analysis of a content the second data based on at least one of the following: an application usage parameter associated with an application generating and/or using the content, a cost-per-click parameter associated with the content, a cost-per-thousand-impressions parameter associated with the content, a key performance indicator associated with the content, and a customer relationship management parameter associated with the content.

27. A computer program product, for transmission of data between a user device and a server, comprising a non-transitory machine-readable medium storing instructions that, when executed by at least one programmable processor, cause the at least one programmable processor to perform operations comprising:
   processing a first data received from the user device and a second data received from the server;
   determining whether to store at least a portion of the second data in at least one memory, and based on the determining, storing the at least a portion of the second data in the at least one memory, wherein the at least a portion of the second data is stored based on a lifetime of content caching policy associated with the at least a portion of the second data and in accordance with content signature and content payload associated with the at least a portion of the second data; and
   providing, based on the content signature and the content payload, the stored portion of the second data to the user device in response to receiving the first data.

28. The computer program product according to claim 27, the operations further comprise
   analyzing content of the second data to determine whether the second data includes at least one redundant data content; and
   deleting the at least one redundant data content from the at least one memory.

29. The computer program product according to claim 28, wherein the analysis of the content of the second data includes performing at least one of the following: a shallow packet inspection of at least one data packet in the second data, and a deep packet inspection of at least one data packet in the second data.

30. The computer program product according to claim 28, wherein the analysis of the content of the second data includes performing analysis based on at least one of the following factors: usage statistics of the second data, at least one trend associated with the second data, a popularity of the second data, application requesting the second data, content of the second data, time when the second data is requested by the user device and/or delivered to the user device, location of the user device, user device information, and a predictability of a usage of the second data by the user device.

31. The computer program product according to claim 27, wherein the stored portion of the second data is provided based on the age of the stored portion of the second data.

32. The computer program product according to claim 27, wherein an evolved node (eNodeB) base station performs at least one of the processing, the determining, and the providing, the eNodeB base station comprising at least one processor and the at least one memory.

33. The computer program product according to claim 32, wherein the operations further comprise
   obtaining at least a portion of the second data for storage in the eNodeB base station.

34. The computer program product according to claim 33, wherein the operations further comprise
   obtaining the at least a portion of the second data without receiving a request to obtain the at least a portion of the second data from the user device.

35. The computer program product according to claim 33, wherein the operations further comprise
   obtaining the at least a portion of the second data based on at least one communication with at least one of the following: the user device and a plurality of user devices.

36. The computer program product according to claim 27, wherein a decoder module performs analysis of the second data based on a payload signature associated with the second data, the payload signature including at least one pointer to a storage location of the stored portion of the second data;
   wherein the payload signature is received from an encoder module, the decoder module is configured to communicate with the encoder module.

37. The computer program product according to claim 36, wherein the payload signature is determined based on a chunk boundary of the second data.

38. The computer program product according to claim 27, wherein the stored portion of the second data is stored in the at least one memory for a predetermined period of time;
   wherein, upon expiration of the predetermined period of time, the stored portion of the second data is purged from the at least one memory.

39. The computer program product according to claim 27, wherein the operations further comprise
   performing analysis of a content the second data based on at least one of the following: an application usage parameter associated with an application generating and/or using the content, a cost-per-click parameter associated with the content, a cost-per-thousand-impressions parameter associated with the content, a key performance indicator associated with the content, and a customer relationship management parameter associated with the content.

* * * * *